US009348897B2

(12) United States Patent
Shoham et al.

(10) Patent No.: US 9,348,897 B2
(45) Date of Patent: May 24, 2016

(54) METHOD AND SYSTEM FOR PROVIDING SCHEDULING SUGGESTIONS

(71) Applicant: GOOGLE INC., Mountain View, CA (US)

(72) Inventors: Yoav Shoham, Los Altos Hills, CA (US); Jacob E Bank, Stanford, CA (US); Dan Ariely, Durham, NC (US); Kumiko T Toft, Palo Alto, CA (US); Zachary I Weiner, Berkeley, CA (US)

(73) Assignee: GOOGLE INC., Mountain View, CA (US)

( * ) Notice: Subject to any disclaimer, the term of this patent is extended or adjusted under 35 U.S.C. 154(b) by 171 days.

(21) Appl. No.: 13/961,609

(22) Filed: Aug. 7, 2013

(65) Prior Publication Data

US 2015/0046440 A1   Feb. 12, 2015

(51) Int. Cl.
*G06F 17/30* (2006.01)
*G06Q 10/10* (2012.01)

(52) U.S. Cl.
CPC ........ *G06F 17/30699* (2013.01); *G06Q 10/109* (2013.01)

(58) Field of Classification Search
CPC combination set(s) only.
See application file for complete search history.

(56) References Cited

U.S. PATENT DOCUMENTS

| 7,084,758 | B1 | 8/2006 | Cole et al. |
| 7,149,810 | B1 | 12/2006 | Miller et al. |
| 9,076,008 | B1 | 7/2015 | Moy |
| 2004/0002932 | A1 | 1/2004 | Horvitz et al. |
| 2006/0064411 | A1 | 3/2006 | Gross et al. |
| 2006/0200374 | A1 | 9/2006 | Nelken |
| 2008/0005075 | A1 | 1/2008 | Horvitz et al. |
| 2008/0033779 | A1 | 2/2008 | Coffman et al. |
| 2008/0056071 | A1 | 3/2008 | Burtner et al. |
| 2008/0147483 | A1* | 6/2008 | Ji ........................... G06Q 10/10 705/7.32 |
| 2008/0162252 | A1 | 7/2008 | Lee et al. |
| 2010/0082376 | A1* | 4/2010 | Levitt ............... G06Q 10/06311 705/7.18 |

(Continued)

FOREIGN PATENT DOCUMENTS

| WO | WO-2015020941 A1 | 2/2015 |
| WO | WO-2015020948 A1 | 2/2015 |
| WO | WO-2015020957 A1 | 2/2015 |

OTHER PUBLICATIONS

"International Application Serial No. PCT/US2014/049566, International Search Report mailed Nov. 24, 2014", 2 pgs.

(Continued)

*Primary Examiner* — Etienne LeRoux

(57) ABSTRACT

A system, computer-readable storage medium storing at least one program, and computer-implemented method for providing scheduling suggestions to a user. A collection of intention objects is accessed. Each of the intention objects is a data structure comprising a plurality of activity attributes of an intention of a user to undertake an activity. Calendar data from a calendar of the user is accessed and an available time slot on the calendar is determined. In response to determining the available time slot, a suggested intention object is selected from the collection of intention objects based on a plurality of activity attributes of the suggested intention object. A scheduling suggestion is then presented to the user. The scheduling suggestion may include a suggestion to schedule an activity associated with the suggested intention object in the available time slot.

20 Claims, 16 Drawing Sheets

(56) References Cited

U.S. PATENT DOCUMENTS

| | | |
|---|---|---|
| 2010/0082624 A1 | 4/2010 | Martin et al. |
| 2010/0122090 A1* | 5/2010 | Dean ................... G06F 21/54 713/168 |
| 2010/0122190 A1* | 5/2010 | Lu ................... G06Q 10/06311 715/764 |
| 2010/0175001 A1 | 7/2010 | Lazarus et al. |
| 2010/0274865 A1 | 10/2010 | Frazier et al. |
| 2010/0311470 A1* | 12/2010 | Seo ................... G06F 3/04883 455/566 |
| 2011/0040756 A1* | 2/2011 | Jones ............... G06F 17/30864 707/737 |
| 2011/0184943 A1 | 7/2011 | Norton et al. |
| 2011/0270517 A1* | 11/2011 | Benedetti ............... G01C 21/20 701/533 |
| 2011/0314404 A1 | 12/2011 | Kotler et al. |
| 2012/0084248 A1 | 4/2012 | Gavrilescu |
| 2012/0166565 A1 | 6/2012 | Hardy et al. |
| 2013/0073329 A1 | 3/2013 | Shoham et al. |
| 2013/0190189 A1 | 7/2013 | Griffiths et al. |
| 2014/0129371 A1 | 5/2014 | Wilson et al. |
| 2014/0164358 A1 | 6/2014 | Benzatti |
| 2014/0316835 A1 | 10/2014 | Cortes et al. |
| 2015/0046210 A1 | 2/2015 | Shoham et al. |
| 2015/0046211 A1 | 2/2015 | Shoham et al. |
| 2015/0046440 A1 | 2/2015 | Shoham et al. |

OTHER PUBLICATIONS

"International Application Serial No. PCT/US2014/049566, Written Opinion mailed Nov. 24, 2014", 9 pgs.

"International Application Serial No. PCT/US2014/049577, International Search Report mailed Nov. 18, 2014", 2 pgs.

"International Application Serial No. PCT/US2014/049577, Written Opinion mailed Nov. 18, 2014", 6 pgs.

"International Application Serial No. PCT/US2014/049598, International Search Report mailed Nov. 25, 2014", 2 pgs.

"International Application Serial No. PCT/US2014/049598, Written Opinion mailed Nov. 25, 2014", 5 pgs.

Non-Final Office Action from U.S. Appl. No. 13/961,516, mailed Jul. 2, 2015, 19 pages.

Non-Final Office Action from U.S. Appl. No. 13/961,559, mailed Jul. 16, 2015, 21 pages.

Final Office Action from U.S. Appl. No. 13/961,559, mailed Nov. 5, 2015, 28 pages.

Final Office Action from U.S. Appl. No. 13/961,516, mailed Nov. 5, 2015, 27 pages.

Non Final Office Action received for U.S. Appl. No. 13/961,559, mailed on Mar. 9, 2016, 31 pages.

Non Final Office Action received for U.S. Appl. No. 13/961,516, mailed on Mar. 9, 2016, 31 pages.

\* cited by examiner

METHOD AND SYSTEM FOR PROVIDING SCHEDULING SUGGESTIONS

TECHNICAL FIELD

Example embodiments of the present application generally relate to task management and, more particularly, to a system and method for providing intelligent task management services to users.

BACKGROUND

Classically, task management involved creating and maintaining one or more paper to-do lists. With the proliferation of mobile computing, task management is now typically handled electronically by way of task management software tools. Traditional task management software tools allow users to manage multiple tasks on multiple task lists, share tasks with other users, set alerts and reminders for certain tasks, and prioritize tasks based on the wishes of the user.

The task lists of traditional task management tools are often outdated, unstructured, and incomplete or unmanageably long. The information for describing individual tasks is often scant, containing little more than a subject and a due date. As a result, the tasks on these lists are often mismanaged and quickly become irrelevant or moot due to the passing of time or a change in other circumstances. Further, although these task management tools allow users to schedule tasks, they do not assist users in determining when to schedule certain tasks or how to prioritize each task on the list of tasks. Moreover, traditional task management tools do not assist users in tracking available time at which one or more tasks may be performed. Additionally, traditional task management tools provide little assistance to users in actually undertaking or completing the tasks on the task lists.

BRIEF DESCRIPTION OF THE DRAWINGS

Some embodiments are illustrated by way of example and not limitation in the figures of the accompanying drawings.

DETAILED DESCRIPTION

Figure 1:
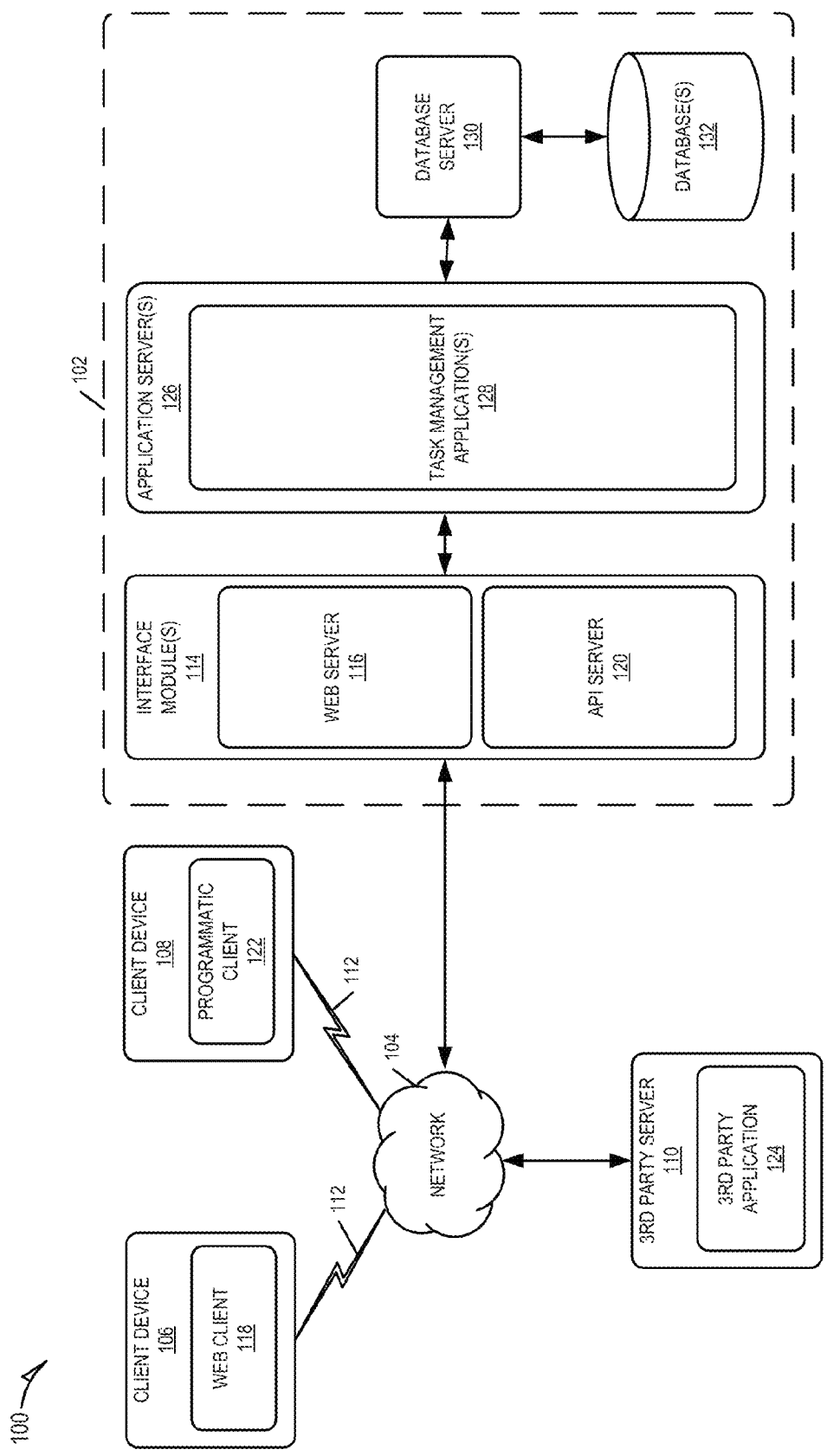
FIG. 1 is a network diagram depicting a data exchange platform having a client-server architecture configured for providing task management services over a network, according to an example embodiment.

Reference will now be made in detail to specific example embodiments for carrying out the inventive subject matter. Examples of these specific embodiments are illustrated in the accompanying drawings. It will be understood that it is not intended to limit the scope of the claims to the described embodiments. On the contrary, it is intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Aspects of the present disclosure describe systems and methods for intelligent task management services including generating an intention object. In example embodiments, the method may include obtaining activity data that defines a plurality of activity attributes of an intention of a user to undertake an activity and obtaining content data including one or more content items related to undertaking the activity. The plurality of activity attributes may include temporal attributes defining time constraints related to the intended activity and contextual attributes that identify contexts related to the intended activity. The data may be obtained from user input or from one or more communications received by the user related to the activity. In some embodiments, the plurality of activity attributes may also include categorical attributes defining a category or type of activity and dependency attributes related to one or more associated activities or users.

Consistent with this embodiment, an intention object may be generated based on the plurality of activity attributes. The intention object may comprise a data structure including the plurality of activity attributes and the content data. The method may further include inferring an additional attribute of the intention object and updating the intention objects based on the additional object. Each generated intention object may simultaneously reside in an intention object collection and one or more communications (e.g., email, calendar invite, etc.) or calendar event. Each generated intention object may have a number of different actions that may be taken with regard to the intention objects themselves (e.g., sharing via email) and a number of different executable actions that may be executed with regard to the respective activities of the intention object. A particular intention object may persist regardless of the actions taken with respect to that object.

As an illustrative example, a user may receive an email confirming a dentist appointment at the dentist's office that same day at 2:30 PM. The system may then analyze the email to obtain the activity attributes defining the user's intended activity, which in this example is the dentist appointment. The activity attributes obtained from the email may include the date and time of the appointment (e.g., a temporal attribute) and the location of the appointment (e.g., a contextual attribute), which in this case is the dentist's office. An intention object including these obtained activity attributes may then be created. A travel time (e.g., an additional attribute) of 15 minutes may then be inferred based on the current location of the user and the location of the dentist's office. The intention object may then be updated to include the inferred attributes.

Aspects of the present disclosure describe systems and methods for intelligent task management services including selectively presenting a user with a collection of intention objects. In example embodiments, the method may include accessing a collection of intention objects belonging to the user. Each of the intention objects may comprise a data structure including a plurality of activity attributes of an intended activity. The plurality of activity attributes may comprise temporal attributes and contextual attributes including a location associated with the intended activity.

Consistent with this embodiment, the method may also include determining a relevancy rank for each of the collection of intention objects based on the plurality of activity attributes corresponding to each intention object. The relevancy rank indicates a suggested order in which the user undertakes each of the respective activities. Upon determining the relevancy rank of each intention object, one or more intention objects with a relevancy rank above a predefined threshold are identified. Graphical representations of the above-threshold intention objects may be presented to the user in a free form spatial interface. In some embodiments, the identified intention objects may be presented to a user in an order listed with the order of the intention objects determined based on the respective relevancy rank.

Continuing with the example presented above, in addition to the dentist appointment intention object, the user may have created an additional intention object for rearranging his sock drawer, which includes a temporal attribute indicating that the duration of this activity is 30 minutes. The user may have created another intention object for a date with his wife at a time and location to be determined at a later time. The user's collection of intention objects may thus comprise the intention objects for the dentist appointment, rearranging the sock drawer, and the date with his wife. A relevancy rank is then determined for each intention object, and assuming each intention object is above the predefined threshold, a graphical representation of each intention object is presented to the user in a free form spatial canvas. If the user is home and it is before 1:15 PM, the rearranging sock drawer intention object may have the highest relevancy ranking, followed by the dentist office intention object, and then finally the date with his wife. The intention objects may be presented to the user in this order in an ordered list.

In some embodiments, the method may also include determining an updated relevancy rank for each intention object and identifying a particular intention object with an updated relevancy rank that is below the threshold. In response to the particular intention object being below the threshold, the particular intention object is removed from the free form spatial interface and from the ordered list.

Following the above example, an updated relevancy ranking for each intention object may be determined in response to the time of day being later than the dentist appointment without the user indicating that the dentist appointment was completed. The updated relevancy rank of the dentist appointment may then be determined to be below the predefined threshold. As a result, the graphical representation of the dentist appointment intention object may be removed from the free form spatial interface.

Aspects of the present disclosure describe systems and methods for intelligent task management services including providing scheduling suggestions to a user. In example embodiments, the method may include accessing a collection of intention objects belonging to the user. Each of the intention objects may be comprised of a data structure including a plurality of activity attributes defining an intention of the user to undertake an intended activity. The plurality of activity attributes may comprise temporal attributes and contextual attributes including a location associated with the intended activity.

Consistent with this embodiment, the method may also include accessing calendar data from a calendar of the user and determining an available time slot on the calendar. In response to determining the available time slot, a suggested intention object is selected from the collection of intention objects. The selection of the suggested intention object may be based on one or more of the plurality of activity attributes of the suggested intention object. The user may then be provided a scheduling suggestion including a suggestion to schedule the activity associated with the suggested intention object in the available time slot. In response to receiving approval of the suggestion by the user, the activity is scheduled in the available time slot.

Following the example from above, the calendar of the user may be accessed and it may be determined that the user currently has a 30 minute opening in his schedule. If the user is home (e.g., the location of his sock drawer), the user may then be provided with a suggestion to rearrange his sock drawer. Upon approval from the user, the rearranging of the sock drawer activity may be scheduled on the user's calendar. Alternatively, it may be determined that the user has a 2 hour opening in his schedule later that day. The user may then be provided a suggestion to schedule a date with his wife during that available time slot. Upon approval from the user, the date with his wife may be scheduled on the user's calendar.

FIG. 1 is a network diagram depicting an example network system 100, according to one embodiment, having a client-server architecture configured for exchanging data over a network. Although the system 100 illustrated in FIG. 1 employs a client-server architecture, the present inventive subject matter is, of course, not limited to such an architecture, and could equally well find application in an event-driven, distributed, or peer-to-peer architecture system, for example.

The network system 100 may include a data exchange platform 102 where clients may communicate and exchange data within the network system 100. The data exchange platform 102 may provide server-side functionality, via a network 104 (e.g., the Internet), to one or more client devices 106, and 108, and to one or more third party servers 110. The client devices 106 and 108 may be executing conventional web browser applications, or applications that have been developed for a specific platform or operating system (e.g., iOS, Android, etc.). The client devices 106 and 108 may, for example, be any of a variety of types of devices including a cellular telephone, a personal digital assistant (PDA), a personal navigation device (PND), a handheld computer, a tablet computer, a desktop computer, a notebook computer, a wearable computing device, or other type of movable device.

The client devices 106 and 108 may communicate with the communication network 104 via a connection 112. Depending on the form of the client device 106 and 108, any of a variety of types of connections 112 and communication networks 104 may be used. For example, the connection 112 may be Code Division Multiple Access (CDMA) connection, a Global System for Mobile communications (GSM) connection, or other type of cellular connection. In another example, the connection 112 may be Wireless Fidelity (Wi-Fi, IEEE 802.11x type) connection, a Worldwide Interoperability for Microwave Access (WiMAX) connection, or another type of wireless data connection. In yet another example, the connection 112 may be a wired connection, such as an Ethernet link, and the communication network 104 may be a LAN, a WAN, the Internet, or other packet-switched data network.

The one or more client devices may be operated by the users of the data exchange platform 102 to exchange data over the network 104. In various embodiments, the data exchanges within the network system 100 may be facilitated by one or more interface modules 114. The interface modules 114 are coupled to, and provide programmatic and web interfaces respectively to, one or more application servers 126. The interface modules 114 may receive requests from various client-computing devices, and communicate appropriate responses to the requesting client devices. For example, the user interface module(s) 114 may receive requests in the form of Hypertext Transport Protocol (HTTP) requests, or other web-based, application programming interface (API) requests.

In various embodiments, the interfaces provided by the interface modules 114 depend on the particular client device being used. For example, the web server 116 may provide web interfaces to the client device 106 using web client 118. The API server 120 may provide programmatic access to the client device 108 using a programmatic client 122, such as a client application, or to a third party server 110 (e.g., one or more servers or client devices) hosting a third party application 124. The third party application 124 may use information retrieved from the data exchange platform 102 to support one or more features or functions on a website hosted by the third party. In some embodiments, the data exchange platform 102 may use information retrieved from a third party website hosted by the third party server 110 to support one or more task management features discussed herein. The third party website may, for example, provide one or more calendaring or communication (e.g., email) services that are supported by the relevant applications of the data exchange platform 102.

The application servers 126 host one or more of the task management services discussed herein. The application servers 126 may be coupled via the interface modules 114 to the communication network 104, for example, via wired or wireless interfaces. The application servers 126 are, in turn, coupled to one or more database server(s) 130 that facilitate access to one or more database(s) 132. In some examples, the application servers 126 can access the database(s) 132 directly without the need for a database server 130. In some embodiments, the databases 132 may include databases both internal and external to the data exchange platform 102.

Figure 2:
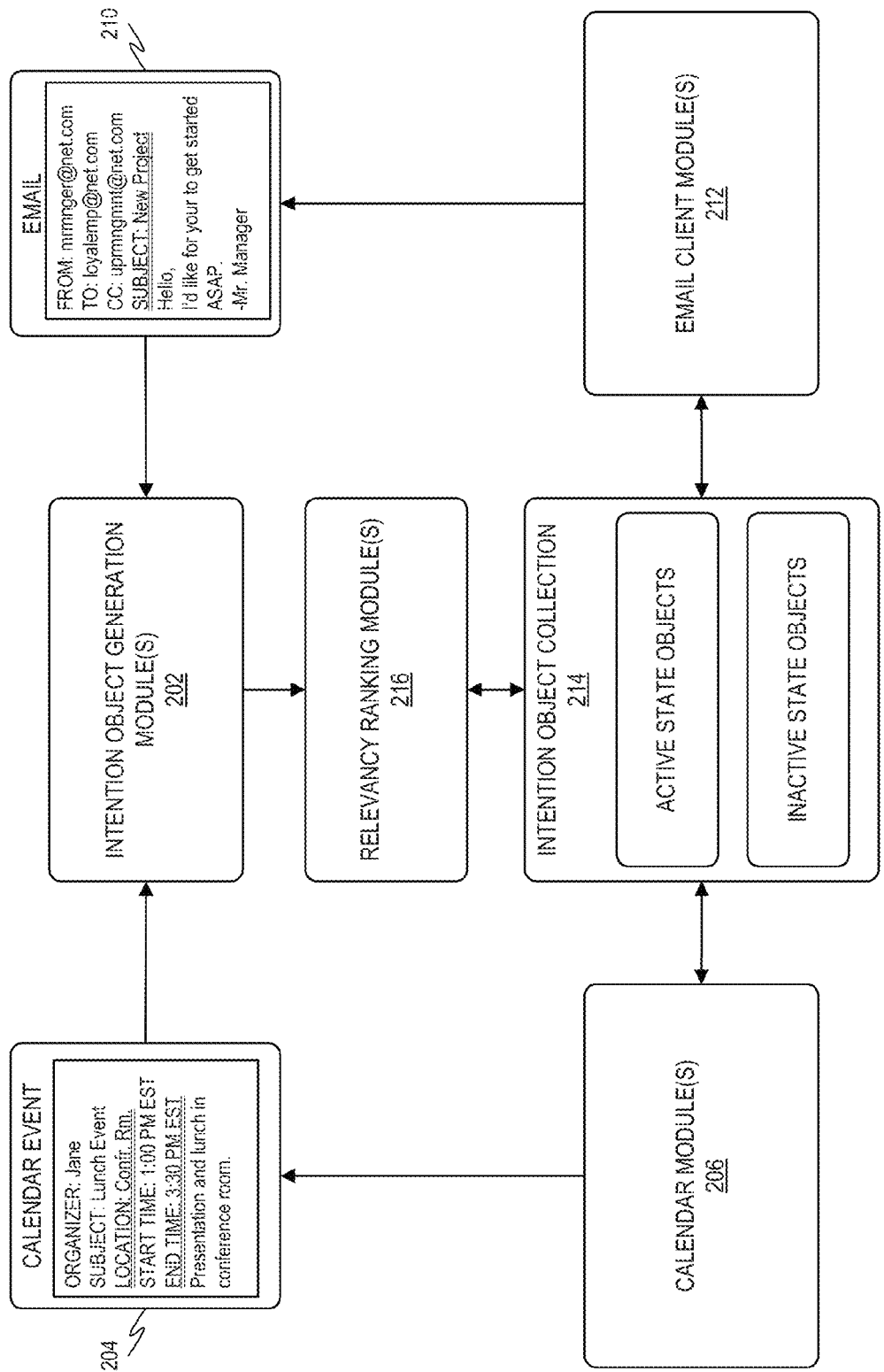
FIG. 2 is a block diagram illustrating an example embodiment of multiple task management applications, which are provided as part of the data exchange platform.

FIG. 2 is a block diagram illustrating an example embodiment of the interactions of multiple modules forming the task management application 128, which are provided as part of the task data exchange platform 102. Each of the modules illustrated in FIG. 2 may be hosted on a dedicated or shared server machine (e.g., application server 126) that is communicatively coupled to enable communication with one or more additional server machines. Each of the modules illustrated in FIG. 2 are communicatively coupled (e.g., via appropriate interfaces) to each other and to various data sources (e.g., third party server 110) so as to allow information to be passed between each of the modules or so as to allow the modules to share and access common data. The modules illustrated in FIG. 2 may furthermore access one or more databases 132 via the database servers 130.

As illustrated in FIG. 2, the modules forming the task management application 128 may include an intention object generation module(s) 202, calendar module(s) 208, email client module(s) 212, intention object collection 214 and relevancy ranking module(s) 216. It will be appreciated that one or more of the various modules forming the task management application 128 may be combined into a single module. Further, in some embodiments, one or more modules may be omitted and additional modules may also be included. Additionally, while the modules illustrated in FIG. 2 are discussed below in the plural sense, it should be noted that a single version of the module may be utilized.

The intention object generation modules 202 may be configured to generate intention objects. In some embodiments, the intention object generation modules 202 may generate an intention object in response to and based on user input entered via a user interface provided by the interface modules 114. Consistent with this embodiment, a user may specify a plurality of activity attributes that may define an intended activity. The plurality of activity attributes may collectively define an intention of the user to undertake an activity. The plurality of activity attributes may, for example, include a title, an activity or task, temporal attributes, contextual attributes and other content. Further details of the data elements and information forming an intention object are discussed below in reference to FIG. 3.

In some embodiments, the intention object generation module 202 may obtain activity data defining one or more activity attributes from one or more communications (e.g., email, calendar invitations, instant messages, text messages, etc.) received by the user. For example, as illustrated in FIG. 2, the intention object generation module 202 may retrieve a calendar event 204 from one or more calendar modules 206. The intention object generation module 202 may analyze and parse the retrieved calendar event 204 to determine the one or more attributes from the information contained therein. The intention object generation module 202 may also infer one or more additional attributes based on the determined one or more attributes.

The source of the calendar data used by the calendar modules 206 may be one or more databases 132 or a storage medium contained in the client device 106. The calendar data may alternatively be retrieved, via API, from one or more third party calendar applications or services hosted by the third party server 110.

As illustrated in FIG. 2, the intention object generation module 202 may alternatively obtain the one or more attributes from an email 210 from email client modules 212. The email 210 may be automatically obtained from the email client modules 212 or in response to user input. In some embodiments, the email 210 is automatically retrieved by the intention object generation module 202 based on the content of the email 210. As with the calendar event 204, the intention object generation module 202 may analyze and parse the retrieved email 210 to determine the one or more attributes from the information contained therein. The intention object generation module 202 may also be configured to infer one or more additional attributes based on the one or more attributes.

The source of the email 210 obtained from the email client modules 212 may be one or more databases 132 or a storage medium contained in the client device 106. The email 210 may alternatively be retrieved, via API, from one or more third party email applications or services (e.g., Gmail, Hotmail, Y mail, etc.) hosted by the third party server 110.

Each intention object generated by the intention object generation module 202 may be added to an intention object collection 214. Each user of the data exchange platform 102 may have a corresponding intention object collection 214. The intention object collection 214 may be stored in one or more databases 132 and subsequently accessed by a client device (e.g., client device 106) of the user. In some embodiments, the intention object collection 214 may be stored locally in a machine readable storage medium of the client device.

Intention objects included in the intention object collection 214 may be stored in either an inactive or active state. The state of each intention object may be based on a relevancy rank determined by a relevancy ranking modules 216. The relevancy rank may provide an indication of a suggested order in which the user undertakes each respective activity of the collection of intention objects. The relevancy rank of each intention object may be determined based on the one or more attributes comprising the intention object. Intention objects with a relevancy rank above a predefined threshold (e.g., above-threshold intention objects) may be placed in an active state. Active state intention objects included in the intention object collection 214 may be presented to a user via a user interface provided by the interface modules 114. Conversely, intention objects with a relevancy rank below a predefined threshold may be placed in an inactive state and may not be displayed to the user.

The calendar modules 206 may provide a number of scheduling and calendaring services to users. To this end, the calendar modules 206 may provide a calendar interface that enables users to view, add, and remove calendar events to particular dates and times. Calendar events may be generated based on user input, or based on one or more intention objects. In some embodiments, an intention object may be added to the calendar of a user based on user input. For example, a user operating a client device with a touch sensitive display may add a particular intention object to the calendar via a single touch gesture (e.g., a swipe, a touch, etc.). In some embodiments, the calendar modules 206 may access the collection of intention objects and select one or more intention objects to be automatically scheduled as a calendar event based on the one or more attributes of the intention object.

Consistent with some embodiments, the calendar modules 206 may be configured to access calendar data of a user and analyze the data to determine open time slots in the schedule of the user. The calendar modules 206 may subsequently access the intention object collection 214 and select one or more intention objects to suggest to the user for scheduling in the open time slot. The one or more intention objects may then be scheduled as calendar events in response to receiving the approval of the user. The scheduled calendar events may include the activity attributes and may maintain a reference to the intention object.

The email client modules 212 may host an email inbox for each user and provide a number of email services to each user including, for example, sending, receiving, accepting, storing and archiving emails from other users and other organizations. The email client modules 212 may also provide users the ability to mark emails in the inbox of the user as "read" or "unread" as well as provide the ability to add customized labels to each email. The email client modules 212 may also enable users to share intention objects with one another. The sharing of an intention object may allow other users to simply view the intention object of another user or the sharing of the intention object may be an invitation to attend an event or activity associated with the intention object. When shared with an additional user, all of the content and attributes of the shared intention object may be included in the communication to the additional user.

In some embodiments, the sharing of the intention object is an assignment of an activity or task associated with the intention object to an additional user or group of users. Consistent with this embodiment, an intention object included in an intention object collection corresponding to a first user, when shared with a second user, may automatically be added to the intention object collection corresponding to the second user.

The task management applications 128 may also include one or more communication modules (not shown), which may be used for generation and delivery of messages (e.g., suggestions, notifications, reminders) to users of the data exchange platform 102. The communication modules may utilize any one of a number of message delivery networks and platforms to deliver messages to users. For example, the communication modules may deliver push notifications, electronic mail (e-mail), instant message (IM), Short Message Service (SMS), text, facsimile, or voice (e.g., Voice over IP (VoIP)) messages.

Figure 3:
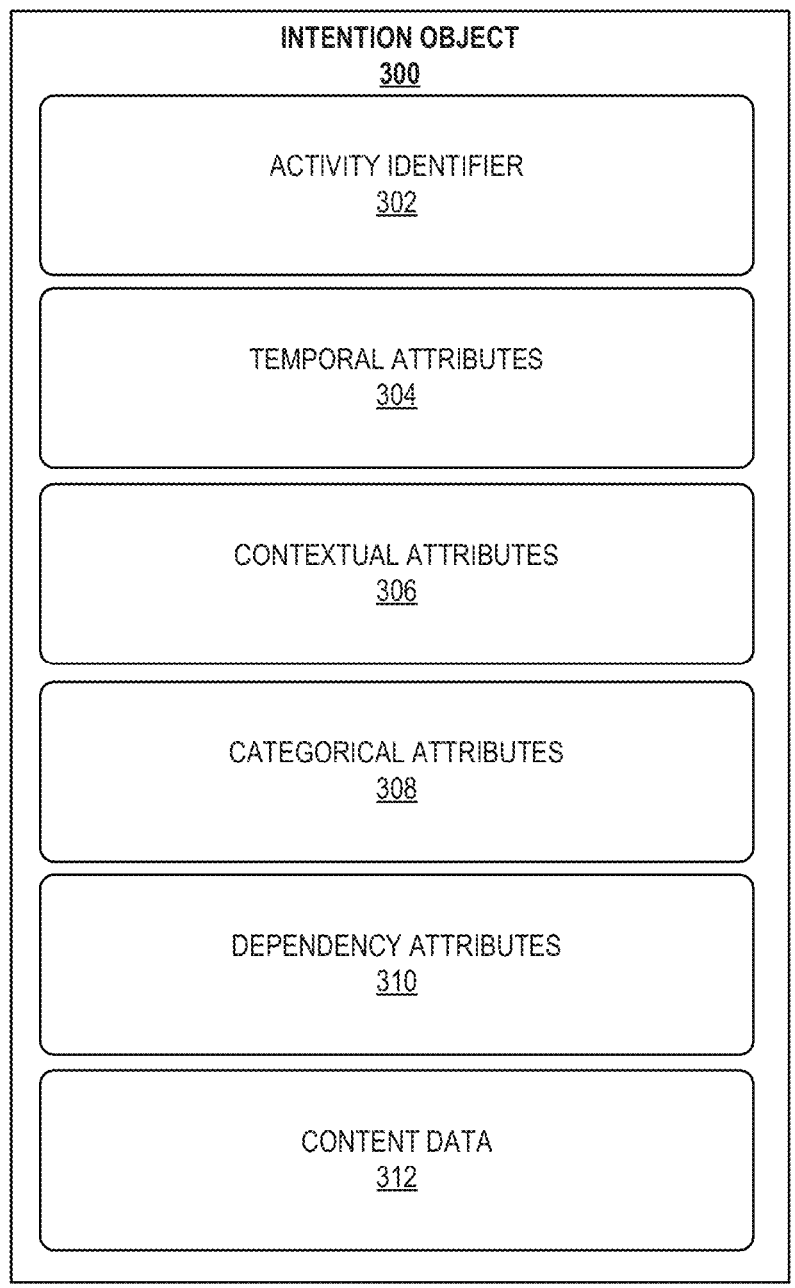
FIG. 3 is a high-level relationship diagram, in accordance with an example embodiment, illustrating various attributes and data elements that are maintained as part of an intention object.

FIG. 3 is a high-level relationship diagram, in accordance with an example embodiment, illustrating various attributes and data elements that are maintained as part of an example intention object 300. Intention object 300 may concurrently reside in the calendar of the user provided by calendar modules 206, an email in the inbox provided by the email client module 212, and in the intention object collection 214.

As illustrated in FIG. 3, the intention object 300 is a data structure comprising an activity identifier 302, a plurality of activity attributes (e.g., temporal attributes 304, contextual attributes 306, categorical attributes 308, dependency attributes 310) and content data 312. The activity identifier 302 may identify the particular activity the user intends to undertake. The activity identifier 302 may be a title, a name, or any other set of words used to refer to the intended activity. The activity may be any action, movement, task or other work to be performed by the user. The activity may be a one-time occurrence or in some embodiments, a recurring activity that is performed at predefined intervals. By way of non-limiting example, the activity may be a work project, a household errand (e.g., house cleaning, grocery shopping, etc.), a phone call to be placed, a meeting or presentation, an email, note or letter to be drafted, or the like.

The plurality of activity attributes may define the intention of the user to undertake the activity identified by the activity identifier 302. The activity identifier may be a title, a name or any other set of words used to refer to the activity. The plurality of activity attributes may include temporal attributes 304, contextual attributes 306, and categorical attributes 308. The temporal attributes 304 define time constraints relating to the activity. The temporal attributes 304 may, for example, include a creation date, a completion date, a start time, an end time, a deadline or due date, a frequency (for reoccurring activities), a duration of time necessary for undertaking an activity, a reminder date or time, a travel time, and an amount of time spent performing the activity. The precision and granularity of each of the temporal attributes 304 may be progressively refined based on user input. For example, a user may specify a time constraint as an exact time (e.g., "at 7:26 a.m."), an approximate time (e.g., "at breakfast"), a time range (e.g., "between 4:00 p.m. and 5:00 p.m."), an exact date (e.g., "on Aug. 16, 2014"), an approximate date (e.g., "in a couple weeks from today"), a date range (e.g., "between Jul. 9, 2013, and Jul. 11, 2013"), or a season (e.g., "summer 2013").

The contextual attributes 306 identify at least one context relating to the activity. The context may be the circumstances that form a setting relevant to the undertaking or completion for an activity. The contextual attributes 306 may, for example, include a location, a mental state of the user, a proximity to another user, a mode of transportation, or a particular environmental setting.

The categorical attributes 308 include one or more categories or types of activities. In some embodiments, the category is based on one or more of the temporal attributes. For example, an intention object with an activity that may depend on a relatively long period of time to complete may be classified as a "long term" intention object. In contrast, an intention object with an activity that may require only a relatively short period of time may be classified as a "short term" intention object. In some embodiments, the category may be based on one or more contextual attributes. For example, an intention object with an activity that must be undertaken at the home of the user may be classified as a "household errand."

As illustrated in FIG. 3, the intention object 300 may also include dependency attributes 310. Dependency attributes 310 relate to dependencies of the intention object 300 and on other intention objects or additional users. The intention object 300 may be associated with or depend on one or more additional intention objects. The intention object 300 may depend on the additional intention object such that the activity of the intention object 300 must be undertaken or completed prior to the activity of the additional intention object. In the case of multiple dependencies, the dependency attributes 310 may also provide an indication of the order in which the activities are to be undertaken. In some embodiments, this order is determined based on the relevancy rank calculated by the relevancy ranking module 216. In some embodiments, the intention object 300 may depend on an activity, action, or event that does not correspond to an intention object.

In some embodiments, the dependency attributes 310 of the intention object 300 may also include information related to one or more additional users related to or important for undertaking the activity. In some embodiments, the activity or task may be assigned to the one or more additional users. The dependency attributes 310 may include an identifier of the one or more additional users such as a name, a title, an email address, a phone number, an employee identification number, or any other information that may uniquely identify the one or more users.

As illustrated in FIG. 3, the intention object 300 may also include content data 312. The content data 312 may include one or more content items or files associated with the activity. By way of non-limiting example, the content data 312 may include a link or list of links associated with the intention, an attached file or collection of files, and one or more reminders to undertake the activity. In some embodiments, the content data 312 may be content that is needed for the user to complete the activity. For example, an intention object corresponding to an intention of a user to create a presentation may include a template file for the presentation as part of the content data 312.

Figure 4:
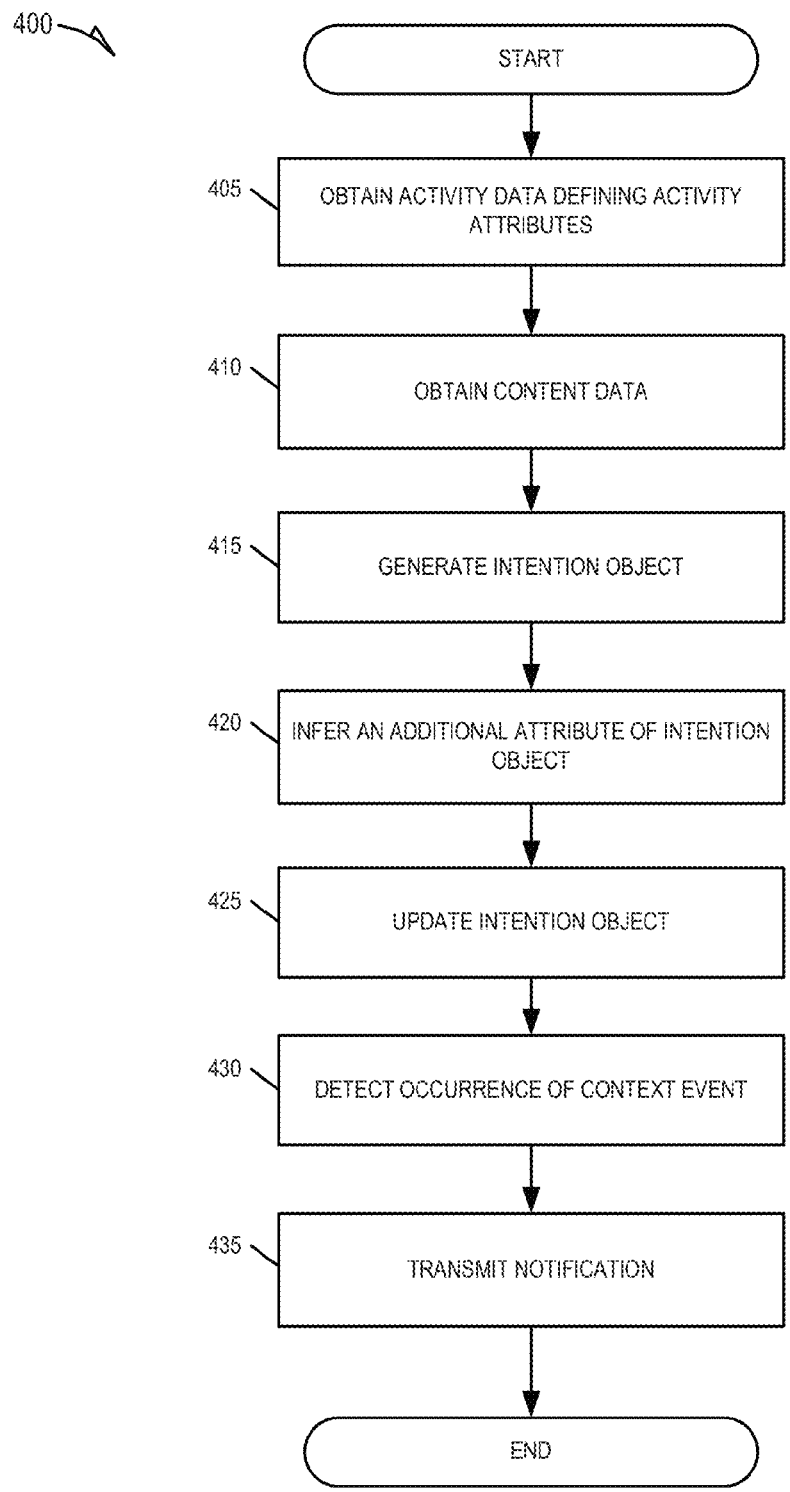
FIG. 4 is a flowchart illustrating an example method for generating an intention object, according to an example embodiment.

FIG. 4 is a flowchart illustrating an example method 400 for generating an intention object, according to an example embodiment. In this example, the method 400 may include operations such as obtaining activity data defining a plurality of activity attributes at operation 405, obtaining content data at operation 410, generating an intention object at operation 415, inferring an additional attribute at operation 420, updating the intention object at operation 425, detecting occurrence of one or more context events at operation 430, and transmitting a notification at operation 435.

At operation 405, activity data defining a plurality of activity attributes of an intention of a user to undertake an activity is obtained. The plurality of activity attributes may include at least one temporal attribute defining a time constraint relating to the intended activity and at least one contextual attribute identifying a context relating to the intended activity.

In some embodiments, the activity data defining the plurality of activity attributes may be obtained from a user via a user interface provided by the interface modules 114. In other embodiments, the obtaining of the activity data comprises obtaining a communication (e.g., a calendar event, an email, a text message, an instant message, a phone call, etc.) related to the activity and parsing the communication to determine the one or more activity attributes.

At operation 410, content data is obtained. The content data may define one or more content items related to or required for the undertaking of the activity. In some embodiments, the content data may be obtained from a user. In embodiments where the one or more attributes are determined from a communication related to the activity, the communication may be automatically included as part of the content data.

At operation 415, an intention object is generated based on the plurality of activity attributes. The generated intention object may comprise a data structure including the plurality of activity attributes and the one or more content items.

At operation 420, an additional attribute of the intention object is inferred based on the plurality of activity attributes. In some embodiments, the additional attribute is a categorical attribute. In some embodiments, the inferring of the additional attribute is based on a physical location of the user. For example, if the contextual attributes of a particular intention object indicate that the activity is to be undertaken at a first location, but the user is in a second location, the travel time for the activity may be inferred based on the location of the user.

In some embodiments, the inferring of the additional attribute is based on a particular client device being used by the user. For example, users with multiple devices may have certain devices for personal use and other devices for business use. If a user initiates the generation of an intention object from a device that is for personal use, it may be inferred that the intention object is in the category of "household errands." Thus, a categorical attribute may be inferred.

At operation 425, the intention object is updated to include the additional attribute. At operation 430, a context event is detected. The context event relates to one or more of the contextual attributes. For example, the contextual attributes may specify a particular location and the GPS functionality of the client device may be used to determine the occurrence of a context event based on the current location of the user being at a location specified by the contextual attributes. In another example, the GPS functionality of multiple client devices may be used to determine the occurrence of a context event based on the user being proximate to another user.

In response to detecting the occurrence of the context, a notification is transmitted to the user at operation 435. Depending on the activity attributes, the notification may be a reminder to the user to undertake the activity. In other embodiments, the notification may be merely a suggestion that the user undertake the activity.

Figure 5:
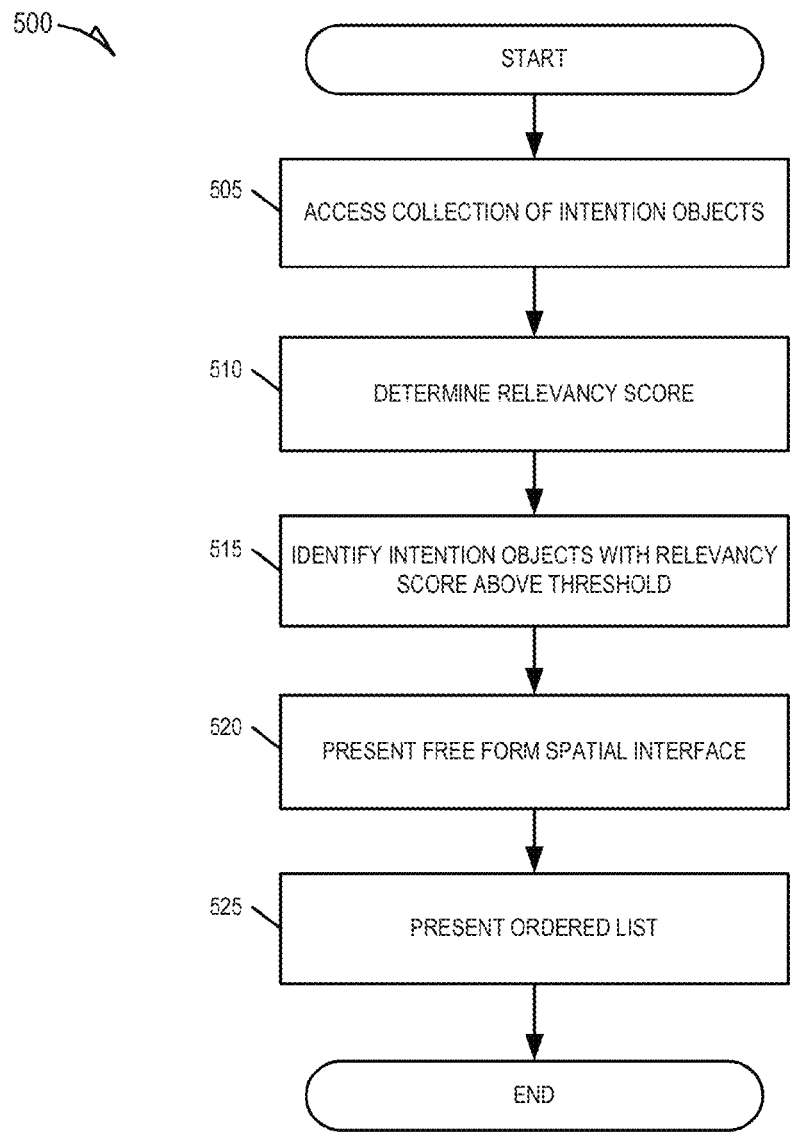
FIG. 5 is a flowchart illustrating an example method for selectively presenting a collection of intention objects to a user, according to an example embodiment.

FIG. 5 is a flowchart illustrating an example method 500 for selectively presenting a collection of intention objects to a user, according to an example embodiment. In this example, the method 500 may include operations such as accessing a collection of intention objects at operation 505, determining a relevancy rank at operation 510, identifying intention objects with a relevancy rank above a threshold at operation 515, presenting a free form spatial canvas at operation 520, and presenting the collection of intention objects in an ordered list at operation 525.

At operation 505, a collection of intention objects belonging to a user is accessed. Each of the intention objects may comprise a data structure including a plurality of activity attributes. The plurality of activity attributes may include one or more temporal attributes and one or more contextual attributes. In some embodiments, the one or more contextual attributes may identify a location for undertaking the activity.

At operation 510, a relevancy rank for each of the intention objects in the collection of intention objects is calculated. The relevancy rank may indicate a suggested order in which the user undertake each respective activity. The relevancy rank may be determined based on the respective activity attributes of each of the intention objects.

At operation 515, one or more above-threshold intention objects with a relevancy rank above a predefined threshold are identified. The predefined threshold may be dynamically set by a user, or in some embodiments, the predefined threshold may be a default value.

At operation 520, graphical representations of the one or more identified intention objects is presented to the user in a free form spatial interface. The presentation of each intention object may include one more executable user interface elements allowing the user to take one or more actions associated with respect to each intention object. Each of the intention objects presented to the user may be placed in an active state, while the remaining intention objects of the collection of intention objects are placed in an inactive state. Consequently, only the intention objects that are the most relevant to the user are presented to the user.

The method 500 may optional include the operation 525, in which the user is presented with the identified one or more intention objects in an ordered list. The order of the list may be determined by the relevancy rank of each of the one or more identified intention objects.

Figure 6:
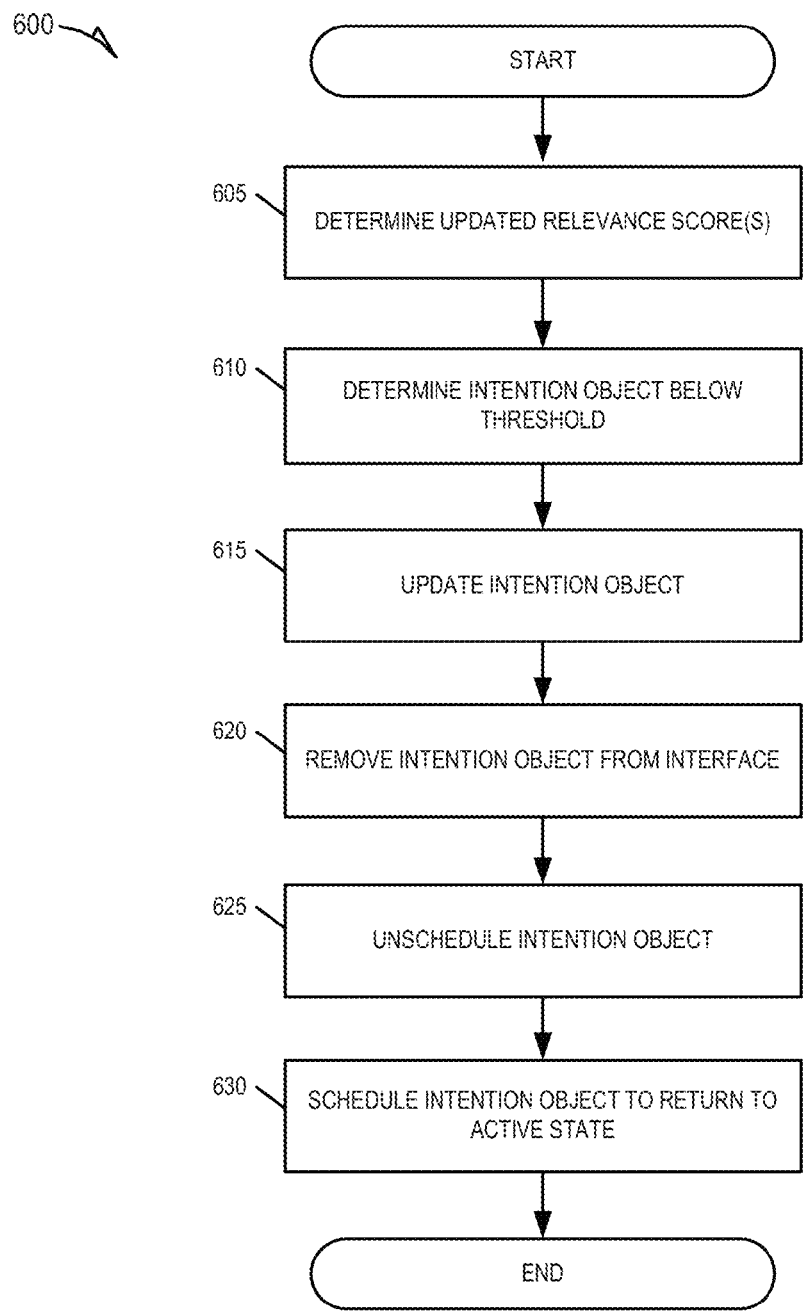
FIG. 6 is a flowchart illustrating an example method for updating a collection of intention objects, according to an example embodiment.

FIG. 6 is a flowchart illustrating an example method 600 for updating a collection of intention objects, according to an example embodiment. The method 600 may begin subsequent to the termination of method 500. In this example, the method 600 may include operations such as determining updated relevancy ranks at operation 605, determining an intention object with a relevancy rank below a threshold at operation 610, updating the intention object at operation 615, removing the intention object from the freeform spatial canvas at operation 620, unscheduling the intention object at operation 625, and scheduling the intention object to be returned to the active state at operation 630.

At operation 605, an updated relevancy rank is determined for each of the intention objects of the collection of intention objects. The determining of the updated relevancy ranks may occur automatically at predefined intervals without any user intervention. In some embodiments, the updated relevancy ranks may be determined in response to a change to the collection of intention objects (e.g., intention objects added or removed). In some embodiments, the updated relevancy ranks are determined in response to a change in location or other circumstances that may form the setting for undertaking one or more respective activities of the collection of intention objects.

At operation 610, the updated relevancy rank for a particular intention object is determined to be below a predefined threshold. The predefined threshold may be the same predefined threshold discussed above with respect to operation 515. In response to the relevancy rank of the particular intention object being below the predefined threshold, the status of the particular intention object is updated to be in an inactive state at operation 615. In response to the particular intention object being inactive, the graphical representation of the particular intention object is removed from the free form spatial interface at operation 620 and unscheduled from the calendar of the user at operation 625.

At operation 630, the particular intention object is scheduled to be returned to the active state. The intention object may be scheduled to be returned to the active state in response to and in accordance with user input.

Figure 7:
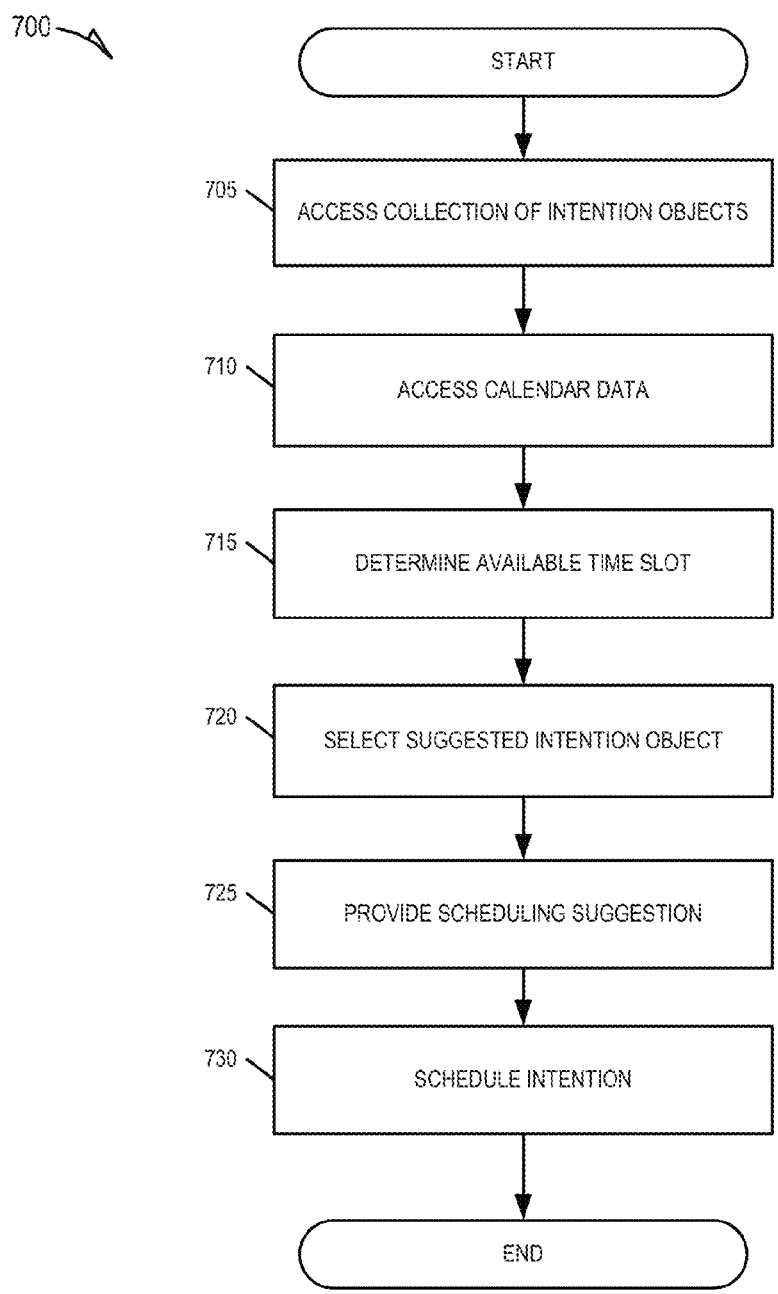
FIG. 7 is a flowchart illustrating an example method for providing scheduling suggestions to a user, according to an example embodiment.

FIG. 7 is a flowchart illustrating an example method 700 for providing scheduling suggestions to a user, according to an example embodiment. In this example, the method 700 may include operations such as accessing a collection of intention objects at operation 705, accessing calendar data at operation 710, determining an available time slot at operation 715, selecting a suggested intention object at operation 720, providing a scheduling suggestion at operation 725, and scheduling the intention at operation 730.

At operation 705, a collection of intention objects belonging to a user is accessed. At operation 710, calendar data from a calendar of the user is accessed. In some embodiments, the calendar data may be retrieved from one or more third party calendar services (e.g., third party application 124). In some embodiments, the calendar data may correspond to one or more calendars of the user provided by calendar module 206.

At operation 715, the calendar data is analyzed to determine an available time slot in the user's schedule. At operation 720, a suggested intention object is selected from the collection of intention objects. The suggested intention object may be selected based on a combination of the length of the available time slot, the plurality of activity attributes of the intention object, and the relevancy rank of the intention object. For example, at operation 715 a fifteen minute available time slot in the schedule of the user may be identified and at operation 720 a particular intention object may be selected as the suggested intention object based on the particular intention object having a temporal attribute indicating that the corresponding activity may take fifteen minutes to complete. In another example, the intention object with the greatest relevancy ranking may be selected as the suggested intention object.

At operation 725, a scheduling suggestion is generated and provided to the user. The scheduling suggestion may include a suggestion to schedule the activity corresponding to the suggested intention object. In some embodiments, the scheduling suggestion may be automatically transmitted to the client device of the user as a notification without the need for an application to be executing. In other embodiments, the scheduling suggestion is provided to the user upon opening the relevant application (e.g., task management application 128). The scheduling suggestion may also provide the user with an ability to quickly schedule the activity of the intention object. Depending on the client device, the activity may be scheduled through a single click, keystroke, or touch screen gesture. In response to receiving such user input, the activity may be scheduled on the calendar of the user at operation 730.

Figure 8:
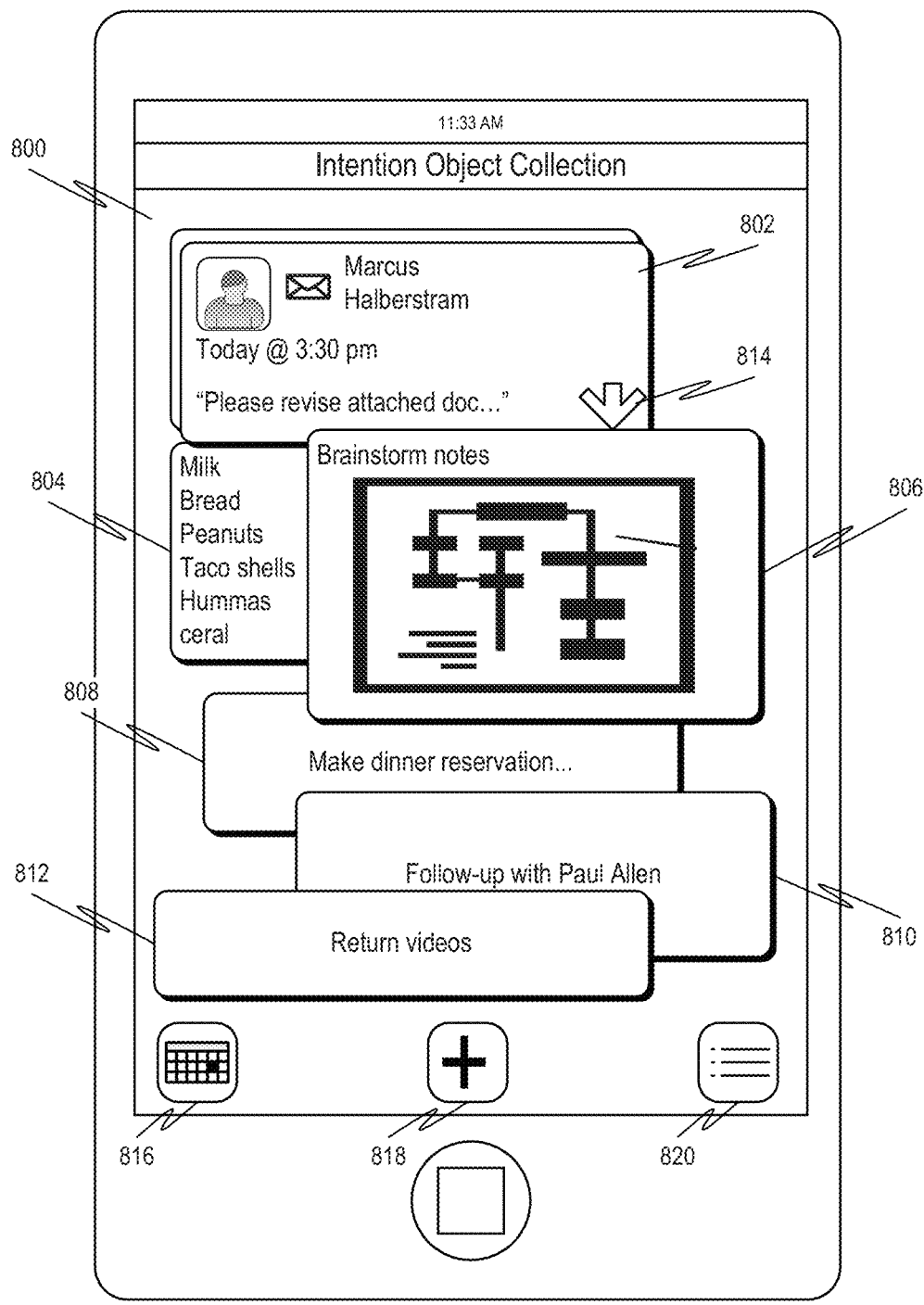
FIG. 8 is an interface diagram illustrating an example free form spatial user interface including a graphical representation of a collection of intention objects, according to some embodiments.

FIG. 8 is an interface diagram illustrating an example free form spatial interface 800 including a graphical representation of a collection of intention objects, according to some embodiments. As illustrated in FIG. 8, graphical representation of the collection of intention objects may include graphical representations of intention objects 802-812. A user may be able to customize the appearance of the graphical representation of each intention object 802-812 by specifying the size, shape, font and color of each of the intention objects 802-812. A user may drag and position each of the intention objects 802-812 anywhere within the free form spatial interface 800. In some embodiments, dragging and dropping an intention object to a particular location or region with the free form spatial interface 800 may cause a particular action to taken with respect to the intention object. For example, a user dragging and dropping intention object 802 to the bottom right quadrant of free form spatial interface 800 may automatically cause a reminder to be set for intention object 802. In another example, a user dragging and dropping intention object 804 to the top right quadrant of free form spatial interface 800 may automatically cause the intention object 804 to be scheduled on the calendar of the user.

In some embodiments, a user may be able to quickly associate two or more intention objects by dragging an intention object over the top of another intention object or group of intention objects. Indicator 814 signifies that intention object 802 contains multiple dependent or associated intention objects. Selection of indicator 814 may cause the display of the one or more dependent intention objects. Further details of this operation are discussed below in reference to FIG. 9. For purposes of this specification, "selection" of a button or other user interface element refers to the receiving of a user input indicating the selection of the button or other user interface. Depending on the client device being used, the user input may be a mouse click or gesture, a keyboard stroke, a voice command, a single gesture on a touch enabled surface or display, accelerometer input, optical recognition input or the like.

As illustrated in FIG. 8, the free form spatial interface 800 may also include buttons 816, 818, and 820 to provide additional functionality. For example, selection of button 816 causes a calendar of the user to be displayed. Further details of this feature are discussed below in reference to FIG. 10. The button 818 allows users to create and add additional intention objects to the intention object collection. Selection of the button 818 may cause an additional interface (not shown) to be displayed. This additional interface may allow a user to input an activity identifier and one or more attributes defining an intention of the user to undertake the activity. Selection of button 820 may cause an alternative display or presentation of the collection (e.g., an ordered list). Further details of this feature are discussed below in reference to FIG. 11.

Figure 9:
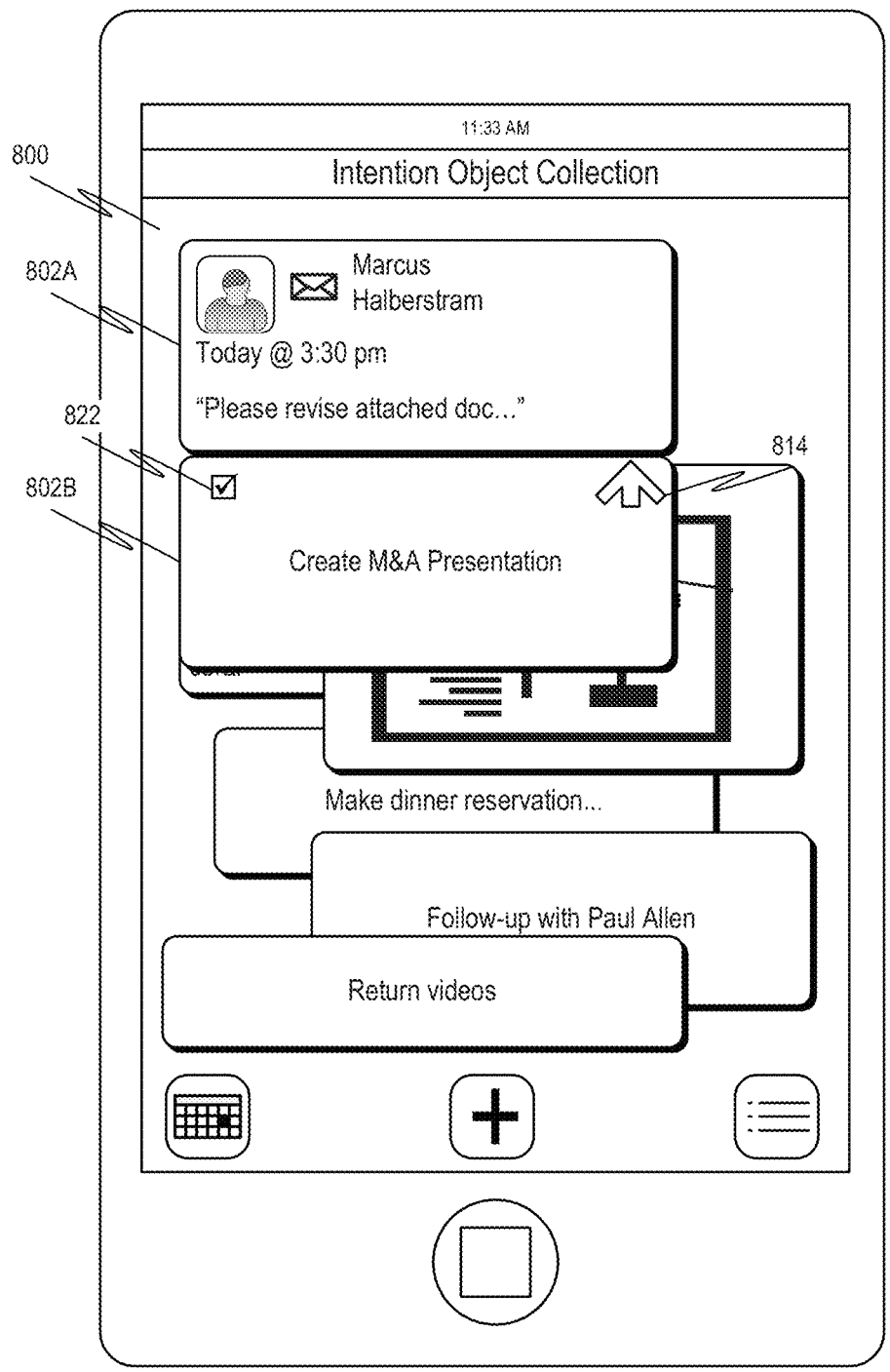
FIG. 9 is an interface diagram illustrating an example dependent intention object, according to some embodiments.

FIG. 9 is an interface diagram illustrating the example free form spatial interface 800 with an example graphical representation of a dependent intention object, according to some embodiments. FIG. 9 illustrates the result of the selection of indicator 814 discussed above in reference to FIG. 8. Intention objects 802A and 802B comprise the intention object 802 displayed in FIG. 8. As illustrated, intention object 802A is dependent upon intention object 802B. Intention object 802A depends on intention object 802B such that the activity corresponding to intention object 802B is to be completed prior to undertaking the activity corresponding to intention object 802A. The intention object 802B also includes indicator 822, which indicates to the user that the activity corresponding to intention object 802B has been completed.

Figure 10:
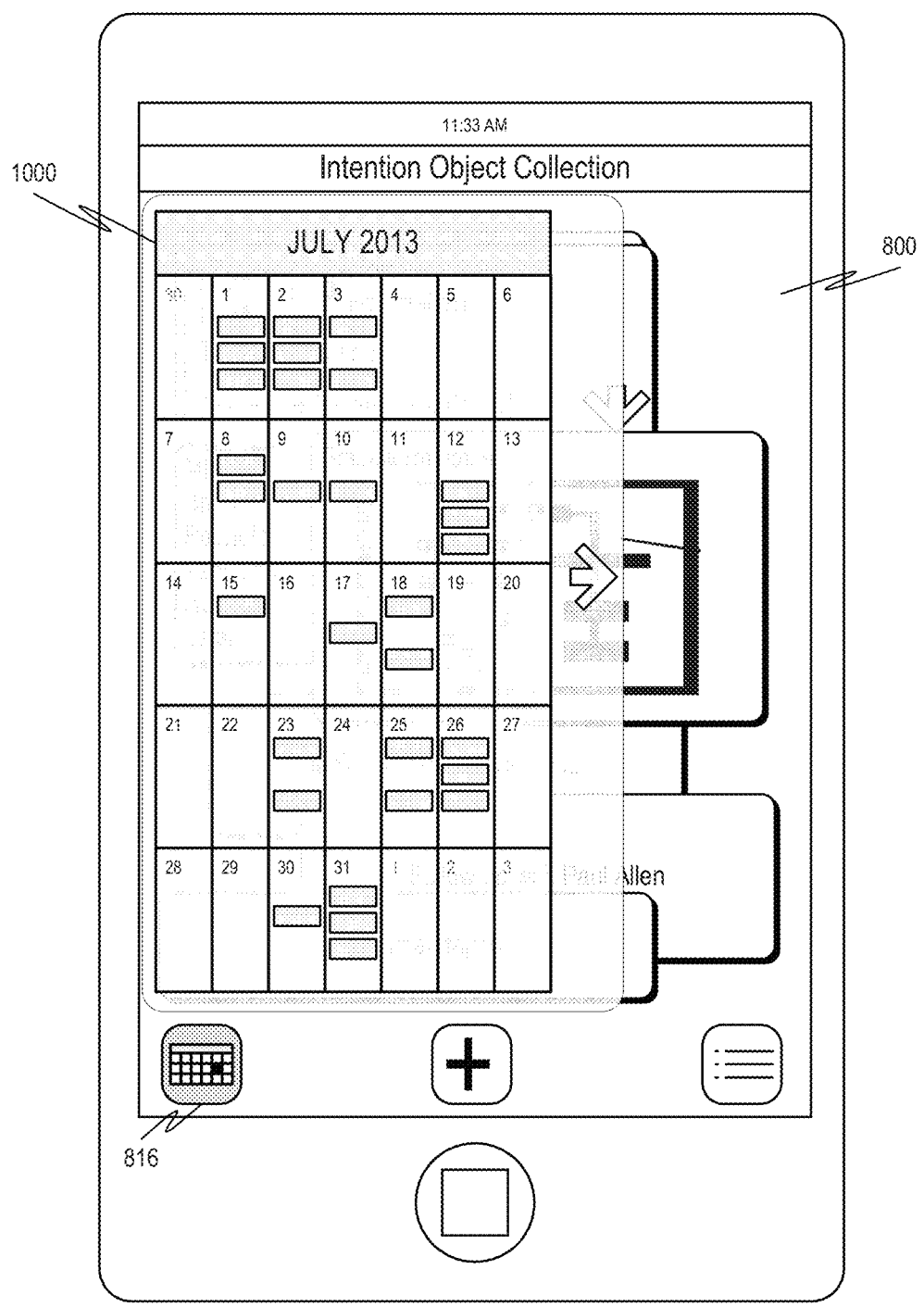
FIG. 10 is an interface diagram illustrating an example collection of intention objects and a calendar, according to some embodiments.

FIG. 10 is an interface diagram illustrating the example free form spatial interface 800 with an example graphical representation of a collection of intention objects and an example calendar 1000, according to some embodiments. The calendar 1000 may be the calendar maintained by the calendar module 206, and may provide the user with all the functionality described herein with respect to the calendar module 206. The calendar 1000 may be displayed to a user in response to selection of button 816 illustrated in FIG. 8. As illustrated in FIG. 10, the calendar 1000 may be presented to the user in a translucent interface overlaid on the free form spatial interface 800. In other embodiments, the calendar 1000 may be presented in an interface that is separate and distinct from the free form spatial interface 800.

Specific dates on the calendar 1000 may also include one or more indicators of calendar events scheduled on those dates and may provide some indication as to the time at which these events are scheduled. In some embodiments, one or more calendar events may correspond to one or more intention objects. These scheduled intention objects may reside on both the calendar 1000 and the free form spatial interface 800.

Figure 11:
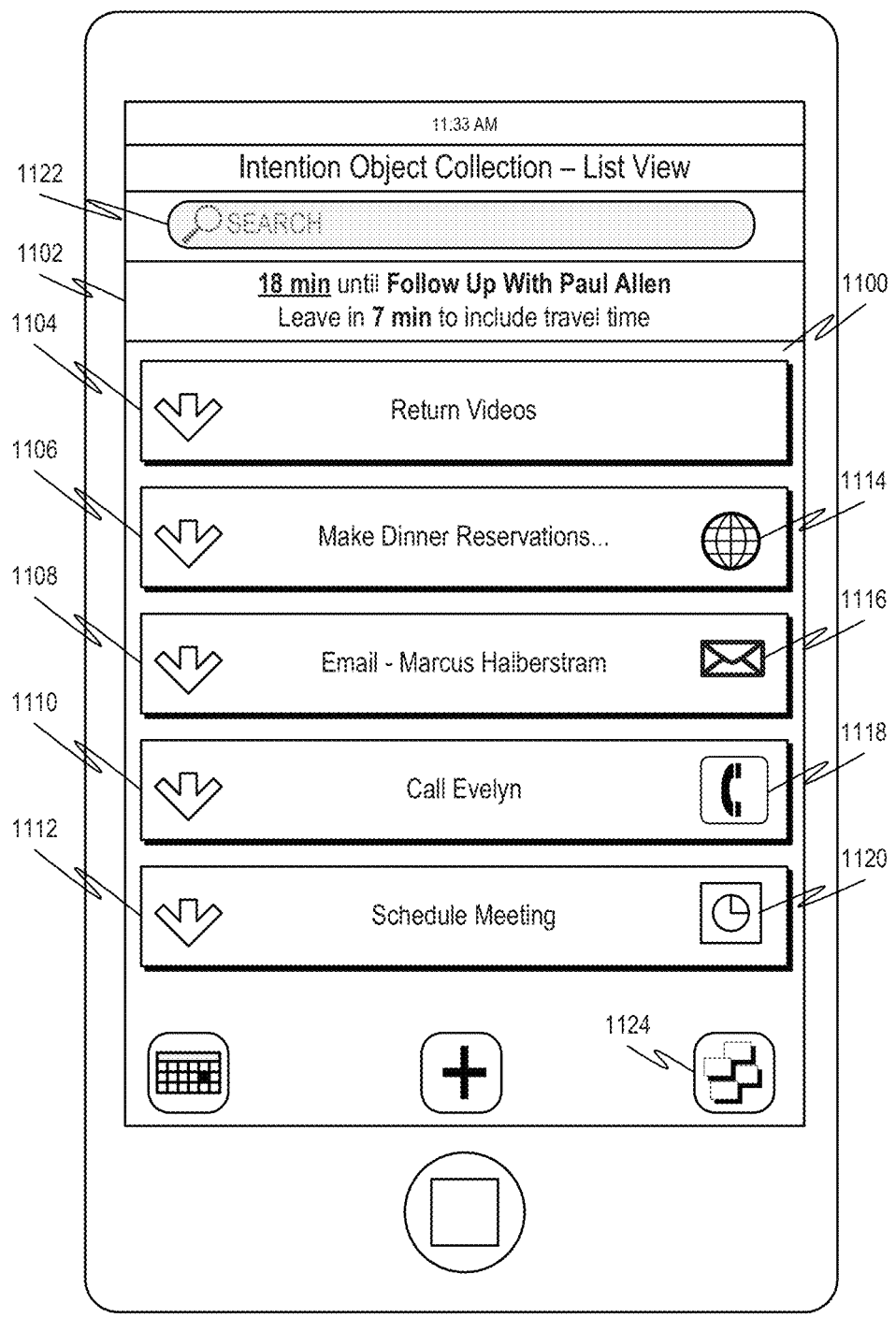
FIG. 11 is an interface diagram illustrating an example collection of intention objects presented in an ordered list, according to some embodiments.

FIG. 11 is an interface diagram illustrating an example collection of intention objects presented as an ordered list 1100, according to some embodiments. The ordered list 1100 may include intention objects 1102-1112. The order in which the intention objects 1102-1112 are presented may be based on the relevancy ranking of each intention object calculated by the relevancy ranking modules 216. The intention object with the highest relevancy ranking (e.g., intention object 1102) may be presented at the top of the ordered list 1100, with each subsequent intention object having the next highest relative relevancy ranking. The intention object with the highest relevancy ranking (e.g., intention object 1102) may be presented as a reminder or notification and may include additional information such as information related to a start time or date, a location, a travel time, additional users related to the activity, and the like.

As illustrated in FIG. 11, the presentation of each of the intention objects 1102-1112 may also include one or more executable action items 1114-1120, respectively. Depending on the activity associated with the intention, a number of different executable action items may be provided. In some embodiments, the particular executable action items that are provided with a particular intention object are based on the one or more categorical attributes 308 of the particular intention objects.

Executable action items 1114-1120 provide the user with one or more actions to undertake or complete the activities associated with each intention object. For example, selection of executable action item 1114 may cause the client device of the user to open a browser application and direct the user to a website that may enable the user to undertake the activity, which in this case is making dinner reservations. Selection of executable action item 1116 may allow a user to compose an email to the intended recipient identified by the dependency attributes of intention object 1108. This email functionality may be provided by the email client module 212 or by a third party application 124. Selection of executable action item 1118 may allow a user to place a phone call to the intended recipient identified by the dependency attributes of intention object 1110. Selection of executable action item 1120 may allow a user to create a meeting request.

As illustrated in FIG. 11, the interface may also include search bar 1122 and button 1124. The search bar 1122 may allow users to enter keyword based queries to search for a particular intention object or a group of intention objects that are part of the intention object collection of the user. As with button 820, button 1124 may allow users to toggle between various views of the intention object collection (e.g., free form spatial interface 800 and ordered list 1100).

Figure 12:
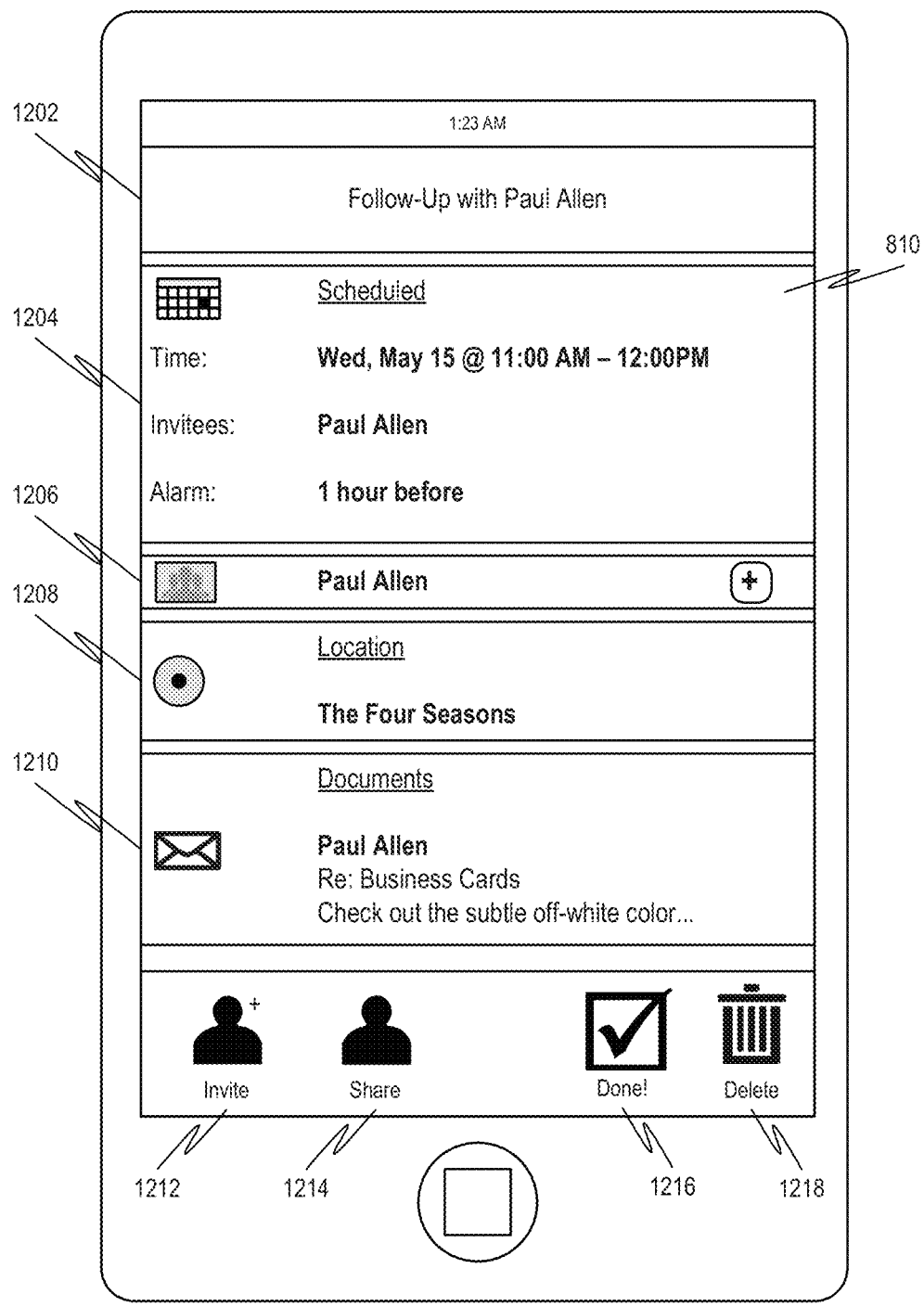
FIG. 12 is an interface diagram illustrating a portion of a detailed view of an example scheduled intention object, according to some embodiments.

FIG. 12 is an interface diagram illustrating a portion of a detailed view of an example scheduled intention object 810, according to some embodiments. The detailed view of intention object 810 may include activity identifier 1202, scheduling data field 1204, dependency data field 1206, location data field 1208, content data field 1210, and buttons 1212-1218. The activity identifier 1202 identifies the activity associated with intention object 810. Intention objects, such as intention object 810, that have been scheduled on one or more of the calendars provided by calendar modules 206 may include scheduling data field 1204. The scheduling data field 1204 may include information related to one or more attributes of the intention object 810. To this end, the scheduling data field 1204 may, by way of non-limiting example, include information such as a scheduled date or time, other invitees or attendees, and one or more reminders. From the detailed view, the user may edit any information therein. The detailed view of an intention object may also provide the user an ability to set a reminder of the intention object with a single touch gesture or drag and drop action.

The dependency data field 1206 relates to one or more dependency attributes of intention object 810 and may identify one or more additional users or additional intention objects that are associated with or depend on intention object 810. The location data field 1208 relates to one or more contextual attributes of intention object 810 and may identify a location associated with the activity identified by the activity identifier 1202. The content data field 1210 relates to the content data of intention object 810 and may include one or more content items or files associated with the activity.

The button 1212, when selected, may provide the user an ability to invite one or more additional users to the scheduled activity. The button 1214, when selected, may allow a user to simply share the intention object 810 with one or more other users. This type of communication functionality of the buttons 1212 and 1214 may be provided by the email client modules 212. The button 1216, when selected, allows a user to mark the intention object 810 as complete. In some embodiments, marking an intention object as complete causes the intention object to be removed from the intention object collection and may cause the execution of method 600. The button 1218, when selected, causes intention object 810 to be deleted and removed from the collection of intention objects.

Figure 13:
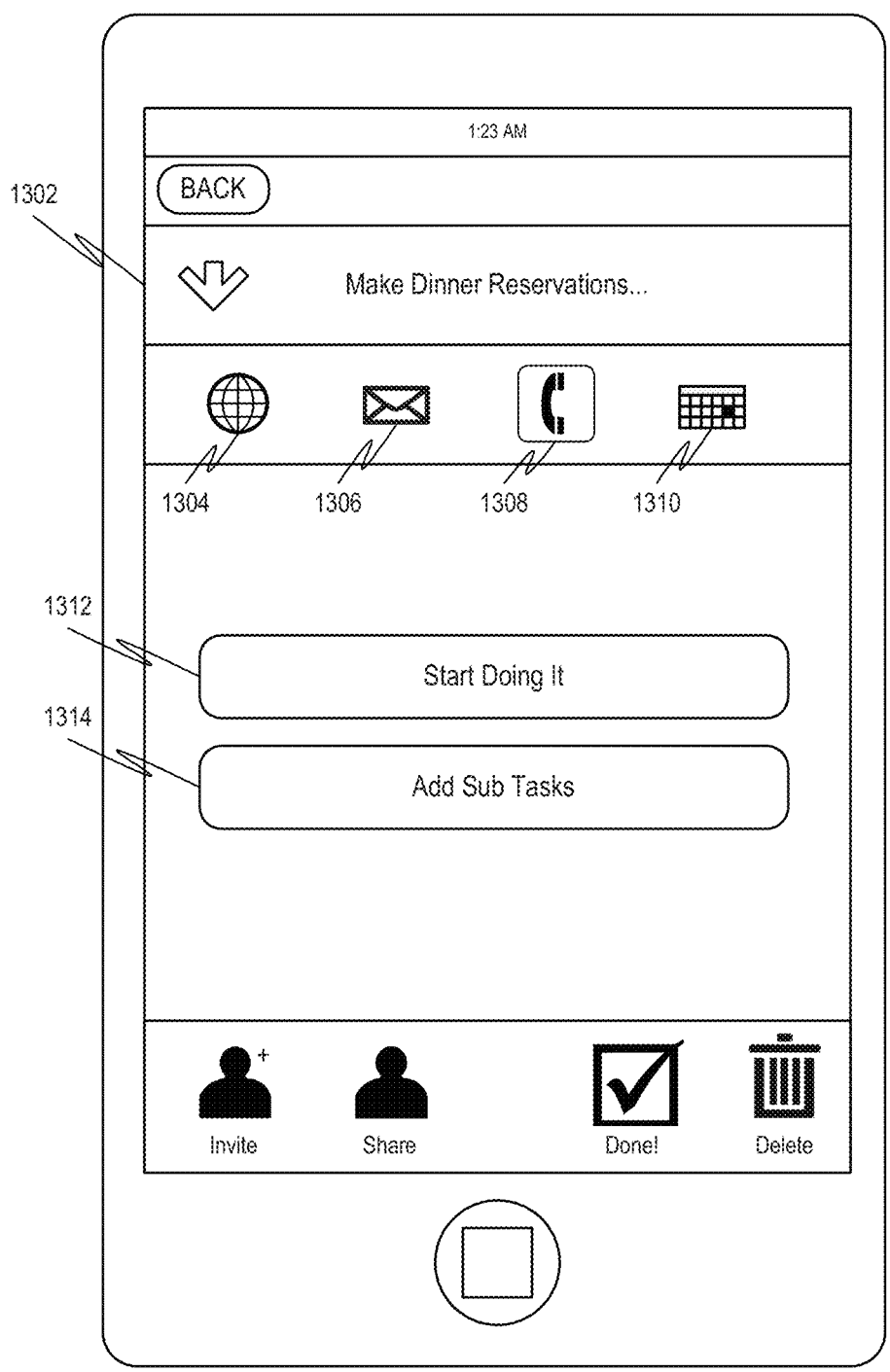
FIG. 13 is an interface diagram illustrating a detailed view of an example unscheduled intention object, according to some embodiments.

FIG. 13 is an interface diagram illustrating a detailed view of an example unscheduled intention object 808, according to some embodiments. The detailed view of intention object 808 may include activity identifier 1302, executable actions 1304-1310, and buttons 1312 and 1314. The activity identifier 1302 identifies the activity associated with intention object 808.

Each of the executable actions 1304-1310 may allow a user to take one or more actions with respect to the intention object 808 regardless of whether the intention object resides in a calendar event, an email, or the intention object collection. For example, selection of the button for action 1304 may cause the client device of the user to open a browser application and direct the user to a website related to the activity identified by activity identifier 1302. The button 1306 may allow a user to compose an email related to the activity identified by activity identifier 1302. This email functionality may be provided by the email client module 212 or by a third party application 124. Similarly, the button 1308 may allow a user to place a phone call related to the activity identified by activity identifier 1302. The button 1310 may allow a user to schedule the activity on one or more calendars of the user provided by the calendar modules 206.

Although the detailed view of intention object 808 is illustrated in FIG. 13 to include only executable actions 1304-1310, it should be appreciated that with other intention objects, and in other embodiments, one or more executable actions may be omitted and one or more additional executable actions may also be included.

Figure 14:
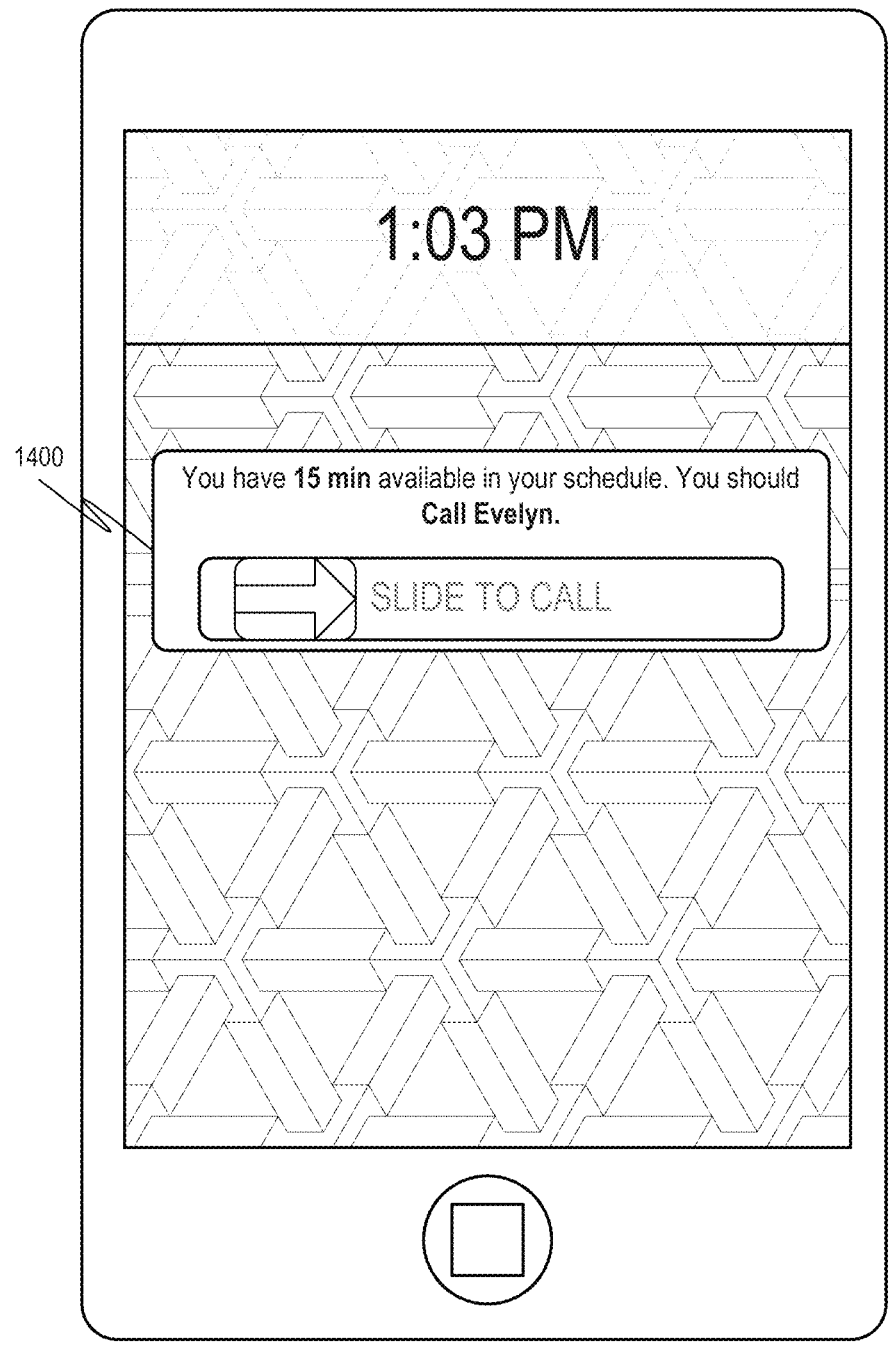
FIG. 14 is an interface diagram illustrating an example scheduling suggestion, according to some embodiments.

FIG. 14 is an interface diagram illustrating an example scheduling suggestion 1400, according to some embodiments. As illustrated in FIG. 1400, the suggestion may be provided to the user as a push notification without the need for the task management application 128 to be executing on the client device. In other embodiments, the suggestion 1400 may be provided to the user upon opening an instance of the application 128.

The suggestion 1400 may identify the pertinent activity and may provide additional information related to one or more attributes of the associated intention object (e.g., intention object 1110). In some embodiments, the suggestion 1400 may be provided to the user in accordance with the operations discussed in reference to method 700. In other embodiments, the suggestion 1400 may be provided to the user in response to detecting an occurrence of a context event related to the contextual attributes of the intention object. For example, the user may be provided the suggestion 1400 in response to the user moving to a particular location as indicated by geolocation data provided by the client device of the user. In other embodiments, the suggestion 1400 may be provided to the user based on the user's browsing preferences.

As illustrated in FIG. 14, the suggestion 1400 provides the user with an ability to immediately undertake the activity with a single input gesture. In other embodiments, the suggestion 1400 may simply allow a user to schedule the activity on one or more calendars of the user.

Example Client Device

Figure 15:
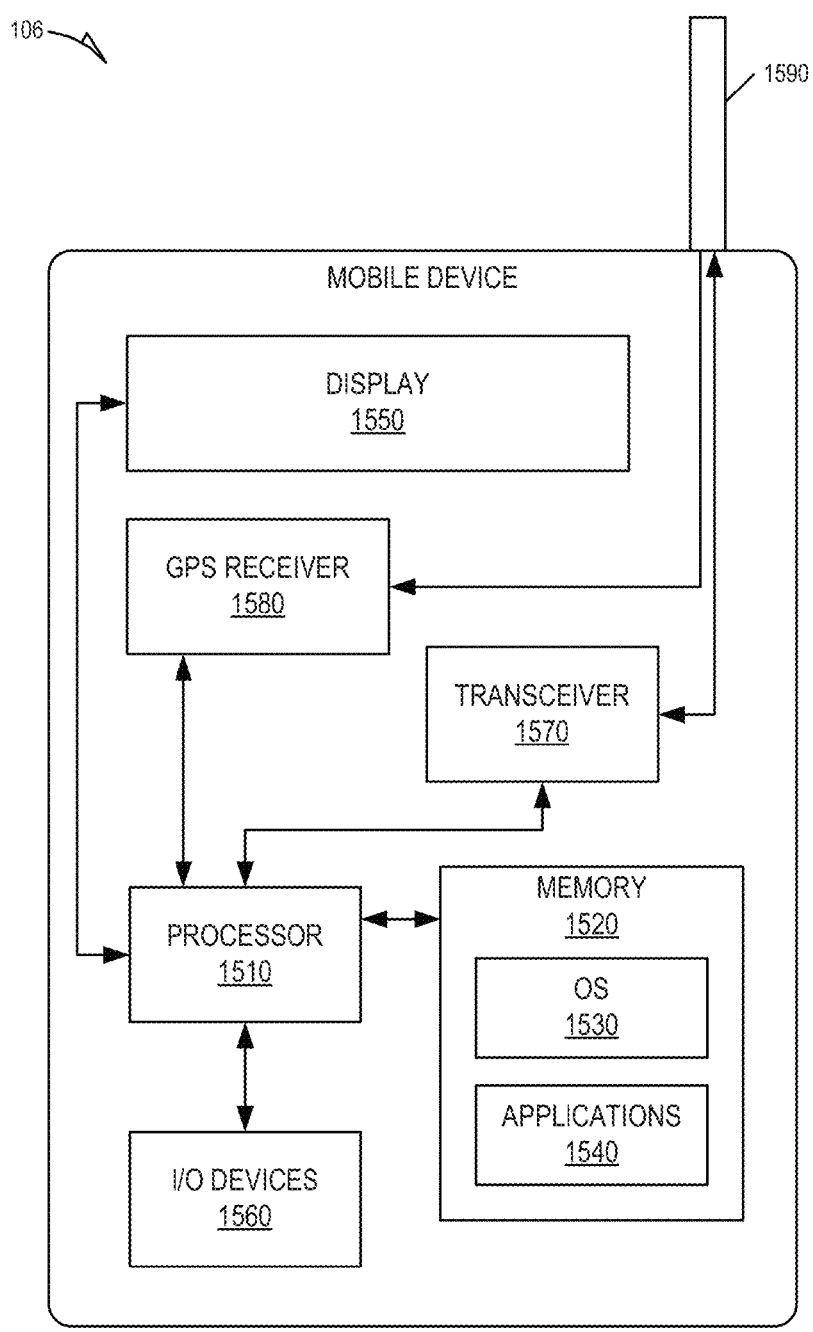
FIG. 15 is a block diagram illustrating a mobile device, according to an example embodiment.

FIG. 15 is a block diagram illustrating a client device 106, such as a mobile device, according to an example embodiment. The client device 106 may include a processor 1510. The processor 1510 may be any of a variety of different types of commercially available processors suitable for mobile devices (e.g., an XScale architecture microprocessor, a Microprocessor without Interlocked Pipeline Stages (MIPS) architecture processor, or another type of processor). A memory 1520, such as a random access memory (RAM), a Flash memory, or other type of memory, is typically accessible to the processor 1510. The memory 1520 may be adapted to store an operating system (OS) 1530, as well as application programs 1540, such as a mobile location enabled application that may provide location based services (e.g., physical location check-in) to a user. The processor 1510 may be coupled, either directly or via appropriate intermediary hardware, to a display 1550 and to one or more input/output (I/O) devices 1560, such as a keypad, a touch panel sensor, a microphone, and the like. Similarly, in some embodiments, the processor 1510 may be coupled to a transceiver 1570 that interfaces with an antenna 1590. The transceiver 1570 may be configured to both transmit and receive cellular network signals, wireless data signals, or other types of signals via the antenna 1590, depending on the nature of the client device 106. In this manner, the connection 112 with the network 104 (FIG. 1) may be established. Further, in some configurations, a GPS receiver 1580 may also make use of the antenna 1590 to receive GPS signals.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 16:
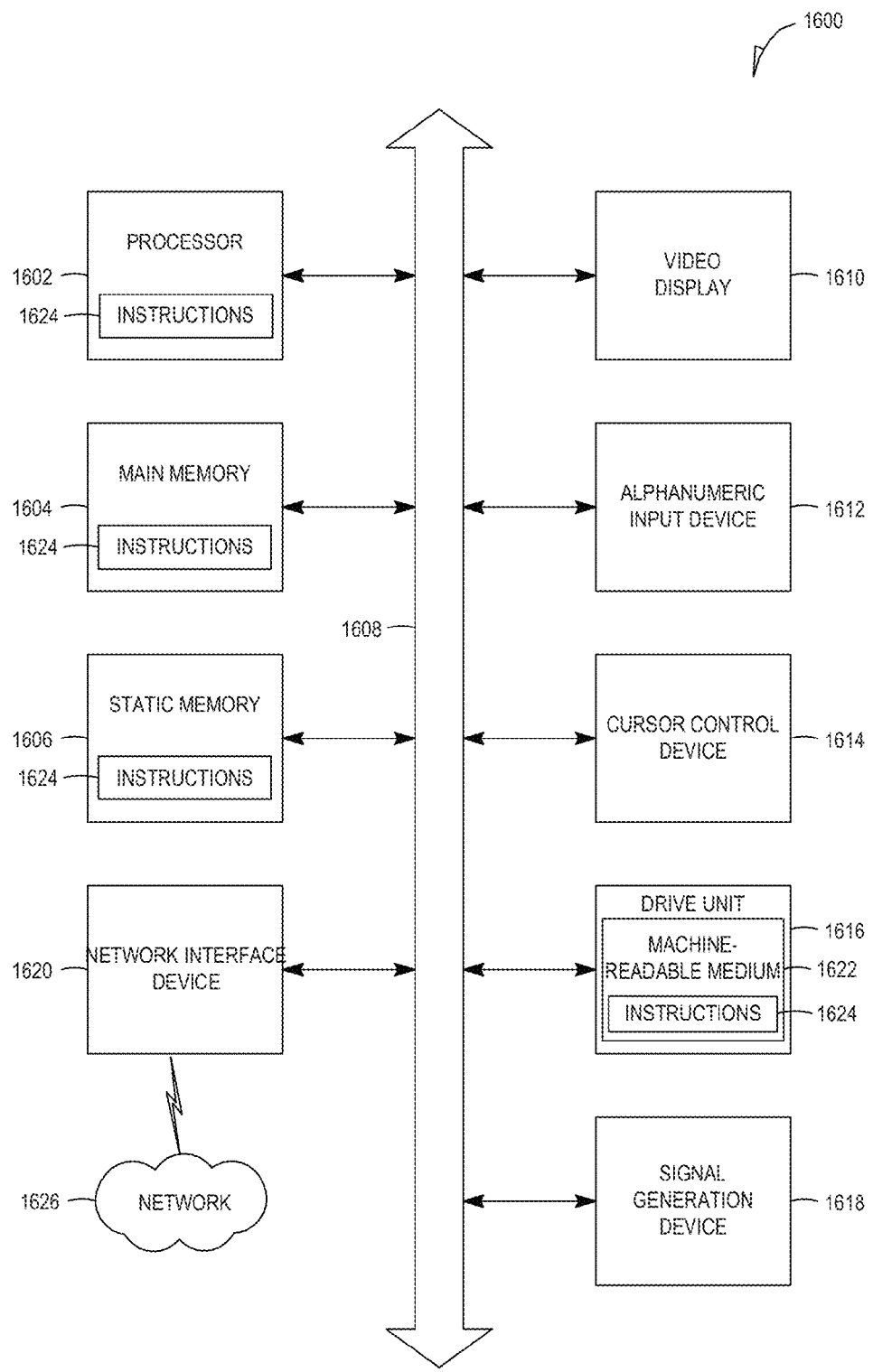
FIG. 16 is a diagrammatic representation of a machine in the example form of a computer system within which a set of instructions for causing the machine to perform any one or more of the methodologies discussed herein may be executed.

FIG. 16 is a block diagram of a machine in the example form of a computer system 1600 within which instructions 1624 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a UI cursor control device 1614 (e.g., a mouse), a disk drive unit 1616, a signal generation device 1618 (e.g., a speaker), and a network interface device 1620.

Machine-Readable Medium

The disk drive unit 1616 includes a machine-readable medium 1622 on which is stored one or more sets of data structures and instructions 1624 (e.g., software) embodying or used by any one or more of the methodologies or functions described herein. The instructions 1624 may also reside, completely or at least partially, within the main memory 1604, static memory 1606, and/or within the processor 1602 during execution thereof by the computer system 1600, with the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more data structures or instructions 1624. The term "machine-readable medium" shall also be taken to include any tangible medium or tangible device that is capable of storing, encoding, or carrying instructions for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Transmission Medium

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying instructions 1624 for execution by the machine, and includes digital or analog communications signals or other intangible media to facilitate communication of such software.

Although the embodiments of the present inventive subject matter have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 316 C.F.R. §1.162(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method, the method comprising:
   accessing a collection of intention objects, each intention object of the collection of intention objects being associated with an activity and comprising one or more temporal attributes and one or more contextual attributes including a location associated with the activity;
   determining a relevancy of each of the intention objects based on a current time, a current location, and the location included in the one or more contextual attributes of each of the intention objects;
   presenting the intention objects to a user in an order based on their respective relevancies;
   selecting one of the intention objects based on the one or more temporal attributes, the one or more contextual attributes, and the determined relevancy, the selected intention object being other than an intention object with a greatest relevancy;
   providing a scheduling suggestion to the user, the scheduling suggestion including a suggestion to schedule the activity associated with the selected intention object;
   causing the selected intention object to be scheduled on the calendar of the user in response to the user dragging and dropping the selected intention object on a first portion of a user interface of the system;
   causing a reminder to be set for the selected intention object in response to the user dragging and dropping the selected intention object on a second portion of the user interface of the system;
   associating the selected intention object with another intention object in response to the user dragging the selected intention object over the other intention object, the association requiring an activity associated with the selected intention object to be performed before an activity associated with the other intention object;
   updating a relevancy ranking of at least one of the intention objects based on a time of day being later than a time included in the intention object without the user indicating that an activity associated with the intention object has been completed; and
   changing a state of the at least one intention object from an active state to an inactive state based on the updated relevancy ranking.

2. The method of claim 1, further comprising updating calendar data such that the activity associated with the selected intention object is scheduled during an available time slot.

3. The method of claim 1, further comprising:
   identifying one or more intention objects included in the collection of intention objects that are in an active state; and
   presenting a user with a free form spatial user interface including graphical representations of the one or more identified intention objects.

4. The method of claim 3, further comprising presenting the user with a translucent view of a calendar with the scheduled activity overlaid on the free form spatial user interface.

5. The method of claim 1, further comprising:
   determining that the relevancy corresponding to a particular intention object of the collection of intention objects is below a predefined threshold, an activity associated with the particular intention object being scheduled on a calendar;
   in response to determining that the relevancy is below a predefined threshold, updating the particular intention object to be in an inactive state; and
   unscheduling the activity from the calendar in response to the particular intention object being in the inactive state while storing the intention object in the inactive state.

6. The method of claim 1, further comprising:
   receiving user input indicating that a particular intention object be added to a calendar of the user, the user input comprising a single touch screen gesture; and
   scheduling the particular intention object on the calendar such that the activity becomes a calendar event.

7. The method of claim 1, further comprising sharing a particular intention object with an additional user.

8. The method of claim 7, further comprising adding the particular intention object to a collection of intention objects of the additional user.

9. The method of claim 7, further comprising scheduling an activity corresponding to the particular intention object on a calendar of the additional user.

10. A tangible machine-readable storage medium embodying instructions that, when executed by a machine, cause the machine to perform operations comprising:
    generating a collection of intention objects by parsing emails to determine activity attributes, each intention object of the collection of intention objects comprising a data structure including a plurality of the determined activity attributes, at least one of the intention objects being in an active state and at least one of the intention objects being in an inactive state;
    assessing calendar data from a calendar of a user;
    determining an available time slot on the calendar;

in response to determining the available time slot, selecting a suggested intention object from the collection of intention objects based on a plurality of activity attributes of the suggested intention object and whether the suggested intention object is in the active state or the inactive state;

providing a scheduling suggestion to the user, the scheduling suggestion including a suggestion to schedule an activity associated with the suggested intention object in the available time slot;

causing the suggested intention object to be scheduled on the calendar of the user in response to the user dragging and dropping the suggested intention object on a first portion of a user interface of the machine;

causing a reminder to be set for the suggested intention object in response to the user dragging and dropping the suggested intention object on a second portion of the user interface of the machine; and associating the suggested intention object with another intention object in response to the user dragging the suggested intention object over the other intention object, the association requiring an activity associated with the suggested intention object to be performed before an activity associated with the other intention object.

11. The tangible machine-readable storage medium of claim 10, further comprising instructions that, when executed by the machine, cause the machine to update the calendar data such that the activity associated with the suggested intention object is scheduled during the available time slot.

12. The tangible machine-readable storage medium of claim 11, further comprising instructions that, when executed by the machine, cause the machine to perform operations comprising:

receiving a user input from a client device of the user, the user input being a single touch screen gesture to remove the suggested intention object from the calendar; and in response to the user input, configuring the suggested intention object to be in an inactive state and removing the suggested intention object from the calendar.

13. The tangible machine-readable storage medium of claim 10, further comprising instructions that, when executed by the machine, cause the machine to perform operations comprising:

identifying one or more intention objects included in the collection of intention objects that are in an active state; and presenting the user with a free form spatial user interface including the one or more identified intention objects.

14. The tangible machine-readable storage medium of claim 10, further comprising instructions that, when executed by the machine, cause the machine to determine a relevancy rank for each intention object of the collection of intention objects based on a plurality of activity attributes comprised by each intention object, the relevancy rank indicating a suggested order in which the user undertake each respective activity.

15. The tangible machine-readable storage medium of claim 14, further comprising instructions that, when executed by the machine, cause the machine to perform operations comprising:

determining that the relevancy rank corresponding to a particular intention object of the collection of intention objects is below a predefined threshold, an activity associated with the particular intention object being scheduled on the calendar;

in response to determining that the relevancy rank is below a predefined threshold, updating the particular intention object to be in an inactive state; and unscheduling the activity from the calendar of the user in response to the particular intention object being in the inactive state while storing the intention object in the inactive state.

16. The tangible machine-readable storage medium of claim 10, further comprising instructions that, when executed by the machine, cause the machine to perform operations comprising:

receiving user input indicating that a particular intention object be added to the calendar of the user, the user input comprising a single touch screen gesture; and scheduling the particular intention object on the calendar such that the activity becomes a calendar event.

17. A system comprising:

a processor of a machine;

a calendar module configured to:
assess calendar data from a calendar of a user and access a collection of intention objects, each intention object of the collection of intention objects comprising a data structure including a plurality of activity attributes, the plurality of activity attributes comprising one or more temporal attributes and one or more contextual attributes including a location associated with the activity, the one or more temporal attributes defining time constraints related to the activity attributes, a precision of the one or more temporal attributes being based on a user choice between at least two of an exact time, an approximate time, a time range, an exact date, an approximate date, a date range, and a season, at least one of the intention objects being in an active state and at least one of the intention objects being in an inactive state; and determine, using the processor of the machine, an available time slot on the calendar, and in response to the determining the available time slot, select a suggested intention object from the collection of intention objects based on a plurality of activity attributes of the suggested intention object and whether the suggested intention object is in the active state or the inactive state; and a communication module configured to:
provide a scheduling suggestion to the user, the scheduling suggestion including a suggestion to schedule an activity associated with the suggested intention object in the available time slot;

cause the suggested intention object to be scheduled on the calendar of the user in response to the user dragging and dropping the suggested intention object on a first portion of a user interface of the system; and cause a reminder to be set for the suggested intention object in response to the user dragging and dropping the suggested intention object on a second portion of the user interface of the system.

18. The system of claim 17, wherein the calendar module is further configured to:

update a relevancy ranking of at least one of the intention objects based on a time of day being later than a time included in the intention object without the user indicating that an activity associated with the intention object has been completed; and change a state of the at least one intention object from an active state to an inactive state based on the updated relevancy ranking.

19. A tangible machine-readable storage medium embodying instructions that, when executed by a machine, cause the machine to perform operations comprising:
- accessing a collection of intention objects, each intention object comprising one or more temporal attributes and one or more contextual attributes including a location associated with an activity, a precision of the one or more temporal attributes being refined based on user input;
- assessing calendar data from a calendar of the user;
- determining an available time slot on the calendar;
- in response to determining the available time slot, selecting a suggested intention object from the collection of intention objects based on a plurality of activity attributes of the suggested intention object;
- providing a scheduling suggestion to the user, the scheduling suggestion including a suggestion to schedule an activity associated with the suggested intention object in the available time slot;
- causing the suggested intention object to be scheduled on the calendar of the user in response to the user dragging and dropping the suggested intention object on a first portion of a user interface of the machine; and
- causing a reminder to be set for the suggested intention object in response to the user dragging and dropping the suggested intention object on a second portion of the user interface of the machine.

20. The tangible machine-readable storage medium of claim 19, wherein the precision is refined based on a user choice between at least two of an exact time, an approximate time, a time range, an exact date, an approximate date, a date range, and a season.

* * * * *